(12) United States Patent
Chung

(10) Patent No.: US 10,126,626 B1
(45) Date of Patent: Nov. 13, 2018

(54) REUSABLE ELECTRICALLY PRINTABLE MEDIUM

(71) Applicant: Amazon Technologies, Inc., Seattle, WA (US)

(72) Inventor: Jerry Yee-Ming Chung, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 100 days.

(21) Appl. No.: 14/665,951

(22) Filed: Mar. 23, 2015

(51) Int. Cl.
*G02B 26/00* (2006.01)
*G02B 26/08* (2006.01)
*G02F 1/29* (2006.01)
*G02F 1/167* (2006.01)
*G02F 1/1333* (2006.01)

(52) U.S. Cl.
CPC ........ *G02F 1/167* (2013.01); *G02F 1/133348* (2013.01)

(58) Field of Classification Search
USPC ........ 359/237, 242, 245–247, 250–255, 267, 359/269–273, 290–292, 295, 296, 298, 359/315–318
See application file for complete search history.

(56) References Cited

U.S. PATENT DOCUMENTS

| 6,411,316 | B1 | 6/2002 | Shigehiro et al. | |
|---|---|---|---|---|
| 6,873,803 | B2 | 3/2005 | Yogome et al. | |
| 8,830,559 | B2 | 9/2014 | Honeyman et al. | |
| 2002/0141801 | A1 | 10/2002 | Shimoda et al. | |
| 2003/0138258 | A1 | 7/2003 | Hoberock et al. | |
| 2008/0142801 | A1* | 6/2008 | Hsu | G02F 1/167 257/59 |
| 2008/0254272 | A1* | 10/2008 | Danner | G02F 1/1333 428/220 |
| 2008/0257508 | A1* | 10/2008 | Park | B41M 5/504 162/137 |
| 2013/0258447 | A1* | 10/2013 | Wu | B32B 38/00 359/296 |

OTHER PUBLICATIONS

"E-Paper Printer, A handheld device prints information directly from a computer into a thin, flexible medium", MIT Technology Review, Nov. 2003, 1 page.
Toshiba, "Green Office Brochure", Toshiba Tec. BR306LPRD30GBEMD1305, Retrieved at <<www.toshibatec.nl/download/715>>, 2013, 8 pages.
(Continued)

*Primary Examiner* — Brandi Thomas
(74) *Attorney, Agent, or Firm* — Lee & Hayes, PLLC

(57) ABSTRACT

Described herein are electrically printable media. The electrically printable medium includes a first flexible structural layer, a second flexible structural layer, and an electronic ink layer comprising a plurality of cells that include charged particles in a fluid. The electronic ink layer is disposed above the first flexible structural layer. The second flexible structural layer is disposed over the electronic ink layer. The electrically printable medium is adapted to have content rendered visible thereon based on electrical signals supplied by a printer.

20 Claims, 17 Drawing Sheets

(56) References Cited

OTHER PUBLICATIONS

Xerox, "Experimental Xerox Paper Erases Itself, Results in Temporary Documents on Reusable Paper", Retrieved on Mar. 23, 2015 from <<http://www.xerox.com/innovation/news-stories/erasable-paper/enus.html>>, 1 page.
"Boogie Board Ewriters", retrieved on Feb. 17, 2015 from <<http://www.myboogieboard.com/na/>>, 5 pages.
Varias, "EnerGenie ePP2 E-paper Printer Never Runs out of E-ink", retrieved from <<http://technabob.com/blog/2013/09/25/energenie-epp2-e-paper-printer/>>, Sep. 2013, 3 pages.
Office Action for U.S. Appl. No. 14/666,050, dated Jul. 8, 2015, Jerry Yee-Ming Chung, "Printer for Reusable Electrically Printable Medium", 13 pages.

\* cited by examiner

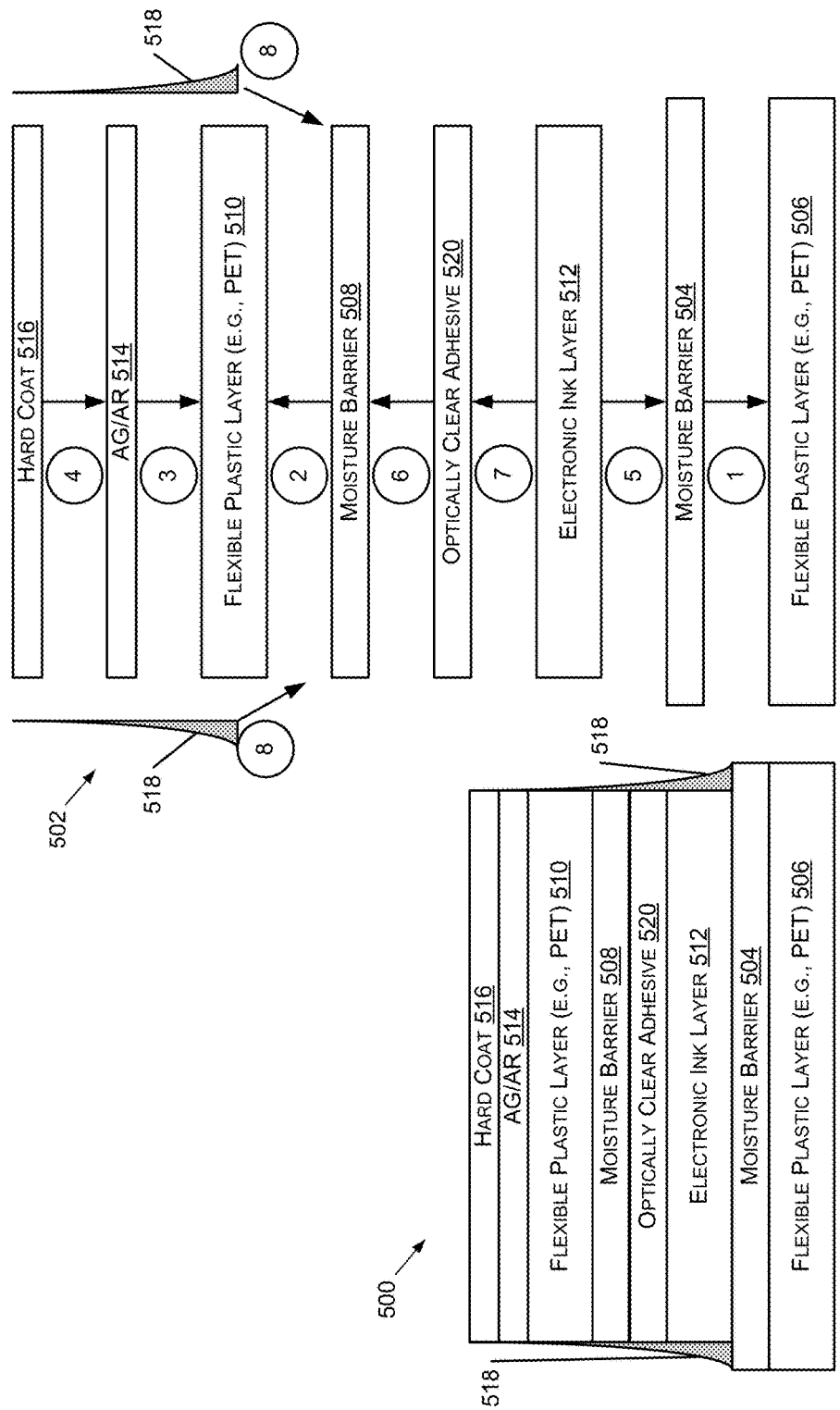

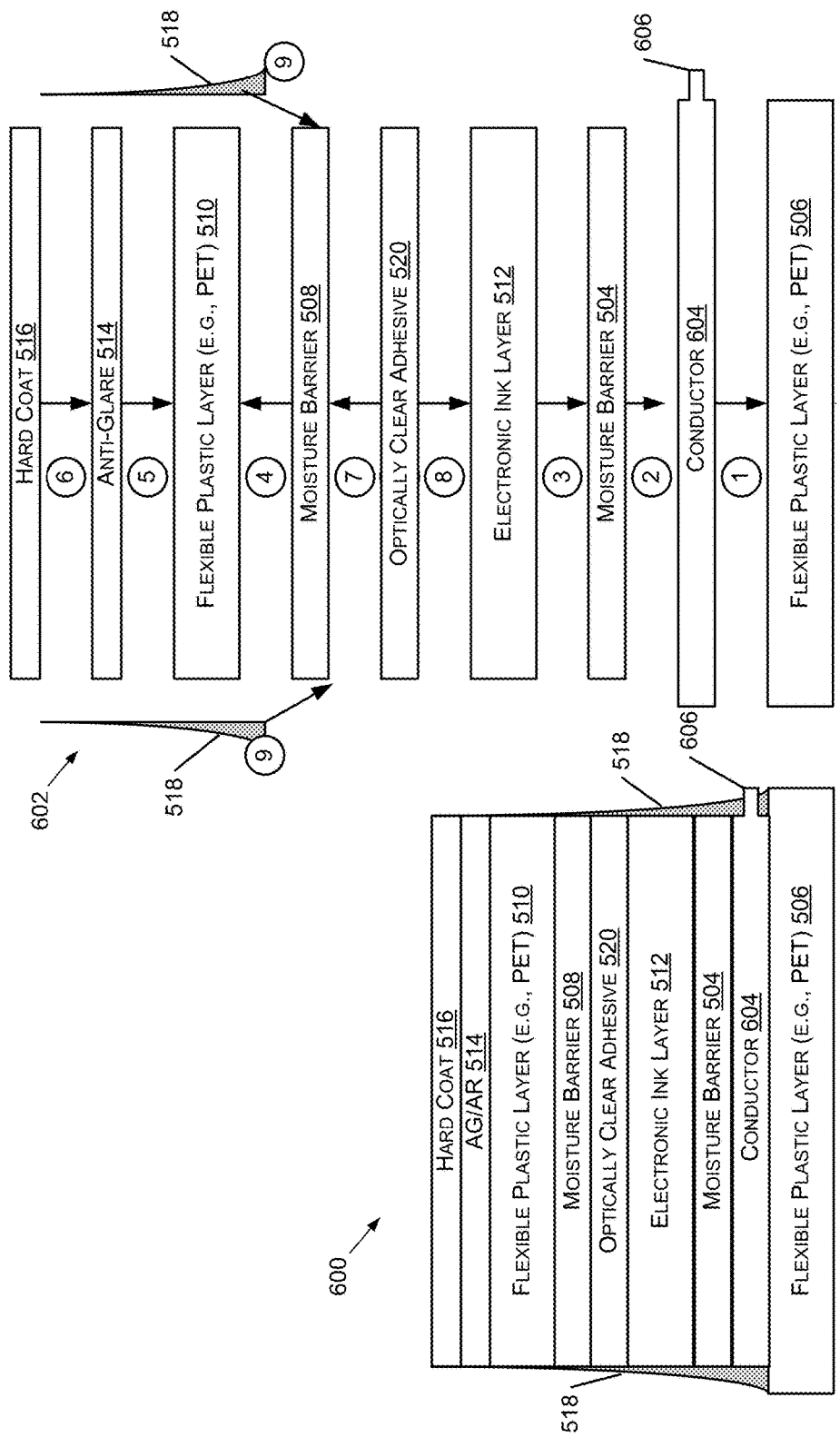

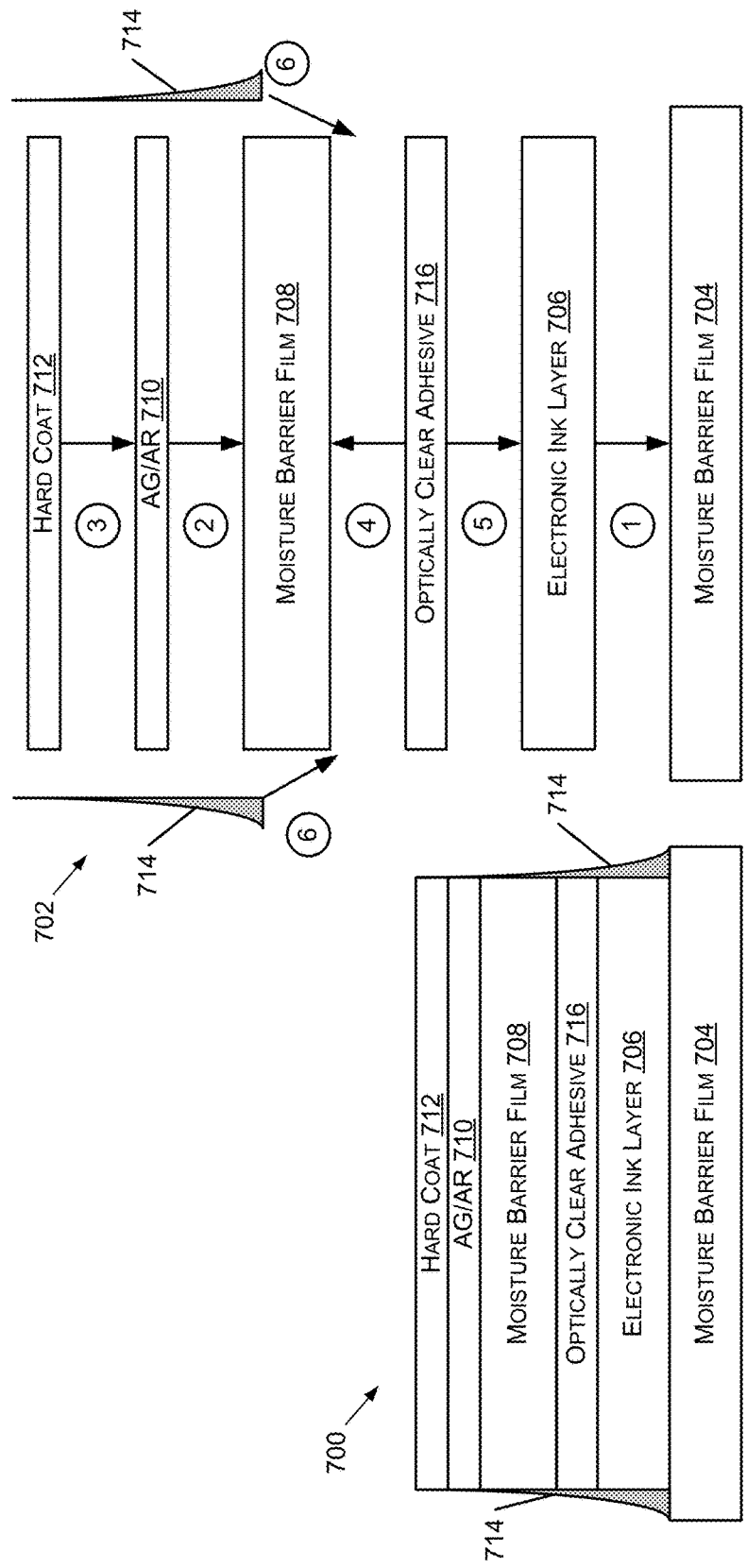

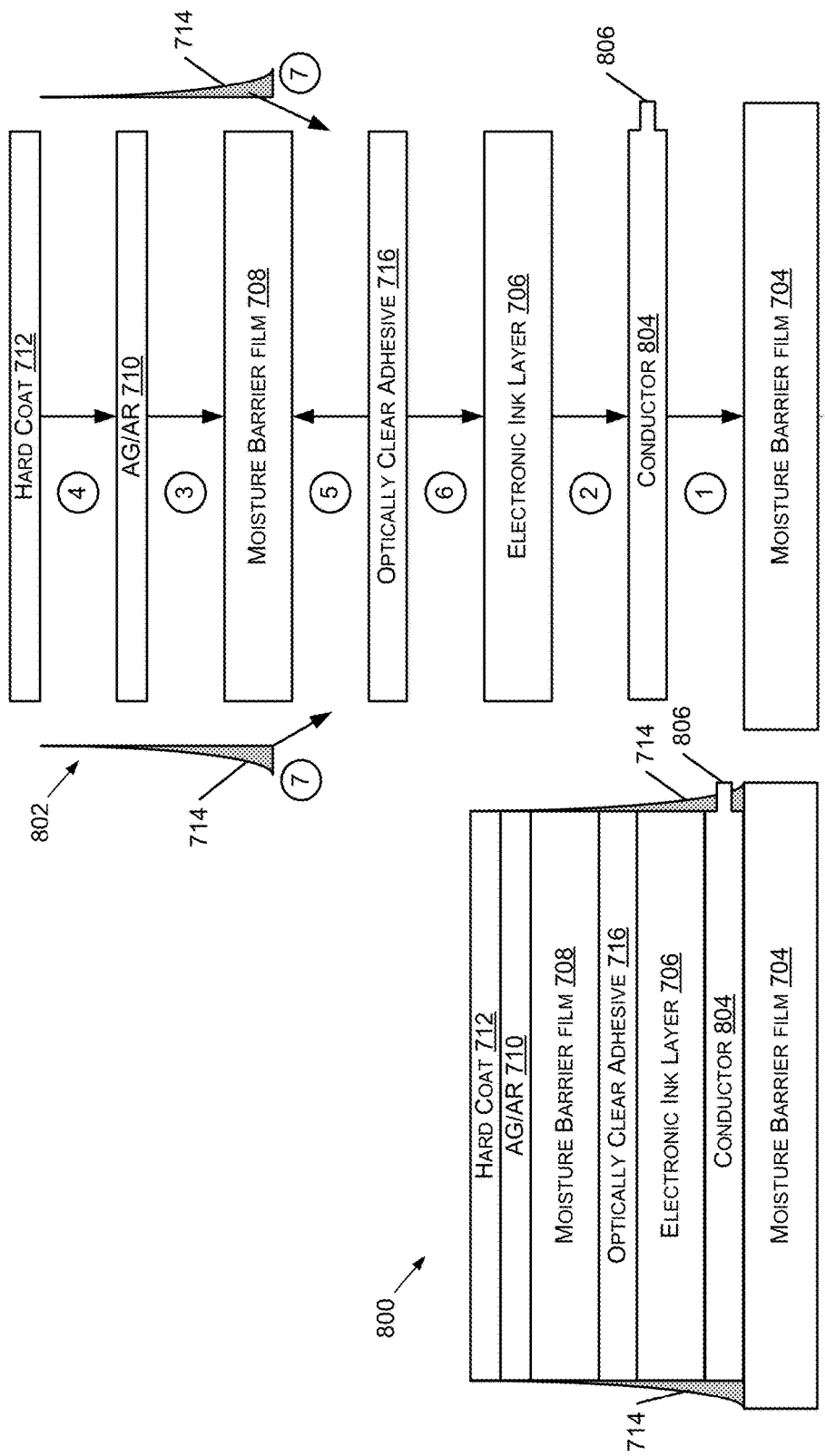

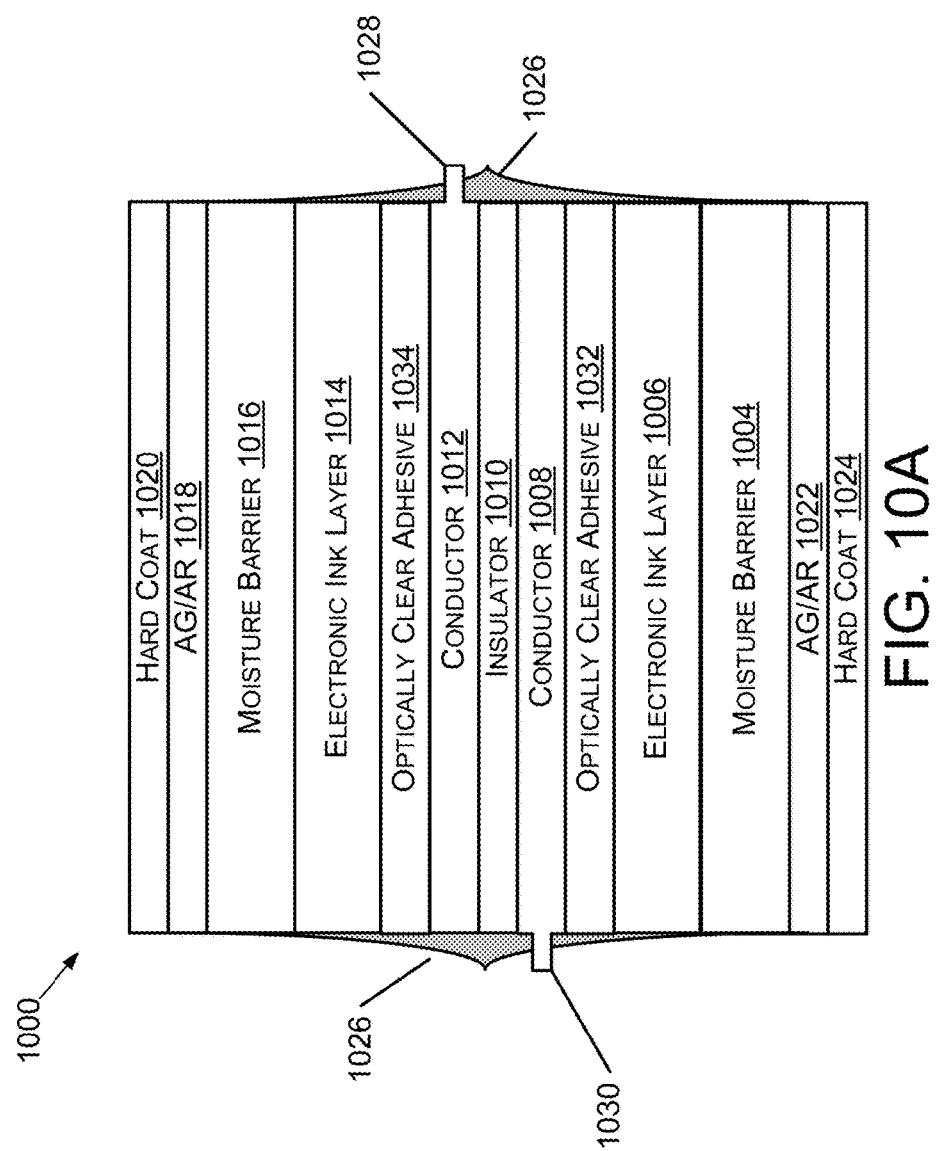

REUSABLE ELECTRICALLY PRINTABLE MEDIUM

RELATED APPLICATIONS

This application is related to concurrently filed U.S. application Ser. No. 14/666,050, entitled "Printer for Reusable Electrically Printable Medium."

BACKGROUND

A conventional laser printer utilizes a rotating drum coated in an organic photoconductor (OPC) material that can be electrically discharged by exposure to light. A charge roller applies a voltage, for example negative 600 Volts, to the surface of the OPC drum. A laser diode generates laser pulses according to a pixel map of the image to be printed, and a rotating polygon mirror causes the laser pulses to be scanned across a surface of the OPC drum, thereby electrically discharging portions of the OPC drum. Charged toner particles are exposed to the OPC drum and thus attracted to those portions of the OPC drum that remain charged. A piece of paper passes between the rotating drum and a positively charged transfer roller. The toner on the drum is pulled and thereby deposited on portions of the paper. A fuser melts the toner onto the paper creating a permanent image. Conventional printing utilizes wood pulp-based paper. Although paper can be recycled, the paper-based printing paradigm may not be sustainable going forward.

Electronic reader devices have become common in recent years. The reading surfaces of such devices include tiny cells of electronic ink. The electronic ink includes charged colored particles suspended in a fluid, and selective application of a voltage differential across the reading surface causes the charged colored particles to rise to the surface, thereby creating a visible image. Useful and popular though they are, electronic reader devices are not a perfect substitute for paper.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIGS. 5A and 5B illustrate, respectively, a cross-sectional view of electronic paper having a flexible plastic layer, a moisture barrier, and an electronic ink layer, and a process for manufacturing the electronic paper.

FIGS. 6A and 6B illustrate, respectively, a cross-sectional view of electronic paper having a conductive layer to assist with electronic printing, and a process for manufacturing the electronic paper.

FIGS. 7A and 7B illustrate, respectively, a cross-sectional view of electronic paper excluding a flexible plastic layer, and a process for manufacturing the electronic paper.

FIGS. 8A and 8B illustrate, respectively, a cross-sectional view of electronic paper excluding a flexible plastic layer and including a conductive layer to assist with electronic printing, and a process for manufacturing the electronic paper.

FIGS. 10A and 10B illustrate, respectively, a cross-sectional view of double-sided electronic paper excluding a flexible plastic layer, and a process for manufacturing the electronic paper.

DETAILED DESCRIPTION

Overview

Figure 1:
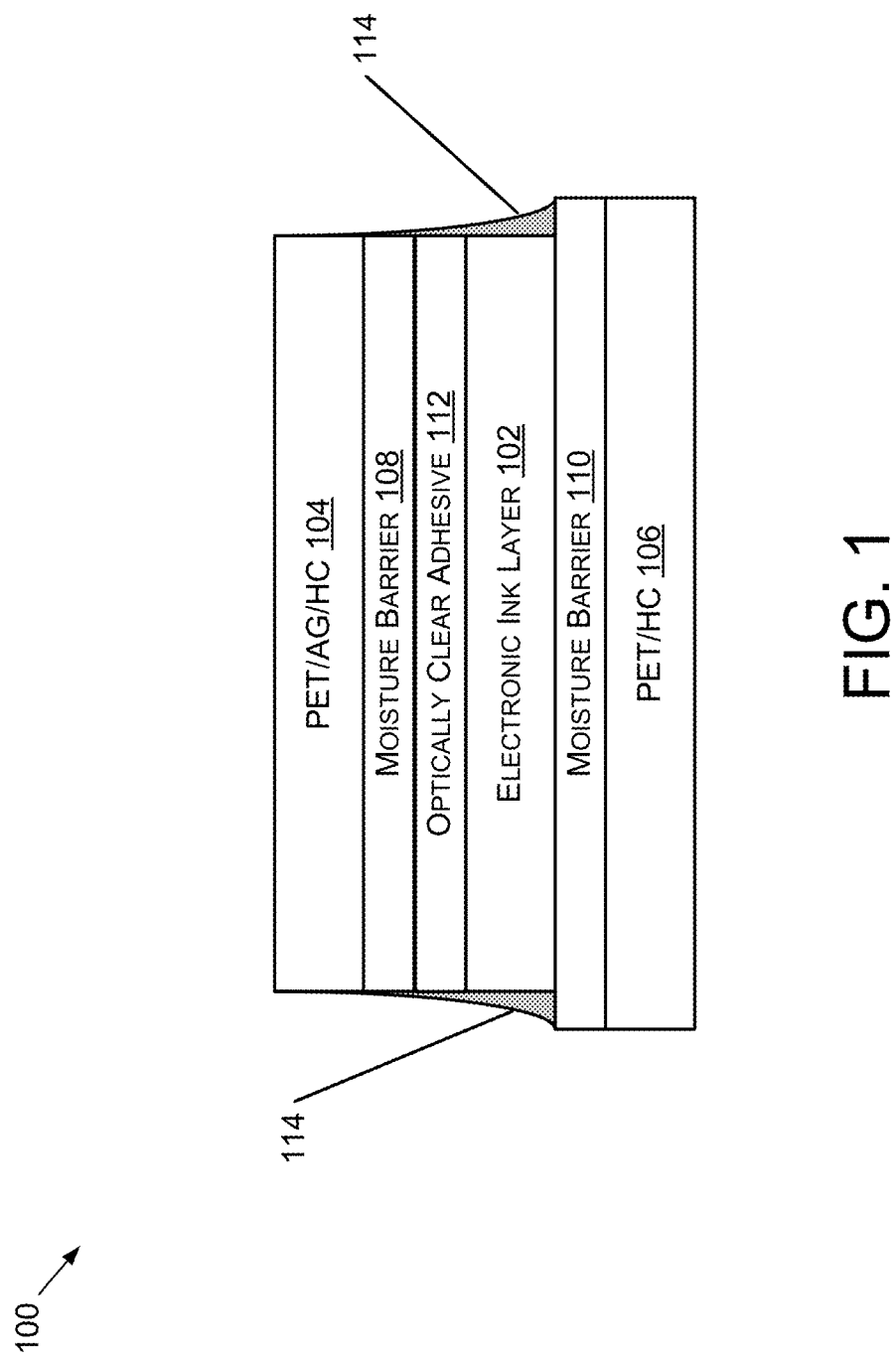
FIG. 1 illustrates a cross-sectional view of electronic paper having an electronic ink layer.

Embodiments of the present disclosure include self-contained reusable electrically printable media. The electrically printable media include multilayer polymer films, which include flexible structural layers, which may be made of plastic, and which include a layer of electronic ink. The electrically printable media, also referred to herein as "electronic paper," is printable by selective application of a voltage differential across its cross-section, thereby causing charged colored particles to rise towards or move away from its surface and create a visible image. Some embodiments of electronic paper include a conductive layer, made of a transparent conductive material, to assist in the printing process. Some embodiments are double-sided, thereby enabling printing on both sides of the image. The electronic paper may be erased by application of a uniform voltage differential across its surface area. Embodiments of the electronic paper described herein are waterproof and more durable than traditional pulp-based paper.

Embodiments of the present disclosure include an electronic paper printing apparatus configured to print images onto electronic paper, such as the electronic paper described herein. In some embodiments, the printer apparatus charges a rotatable organic photoconductor (OPC) drum and selectively scans the OPC drum with laser pulses or Light Emitting Diode (LED) array to create areas with different charge levels across the OPC drum. Electronic paper is fed under the rotatable OPC drum thereby causing the specific colored charged electronic ink particles therein to rise to the surface, or move towards the bottom, and leave an image thereon. The printer apparatus also, in some embodiments, includes erase rollers to generate a uniform image across the paper prior to printing, discharge rollers to remove latent charges from the surface of the electronic paper after printing, and a cleaning roller to remove dust or other debris from the surface of the electronic paper. Removing the latent charges from the surface of the electronic paper prevents shocking a user or something else after the printing, and also prevents corruption of the image printed thereon. In embodiments, the printing apparatus may be a multi-function apparatus also capable of adhering toner to pulp-based paper.

Embodiments of the present disclosure include a reconditioning apparatus that cleans dust, dirt, and other debris from the surface of electronic paper and/or erases printed images from the electronic paper by application of uniform voltage differential across the cross-section of the electronic paper. The reconditioning apparatus may serve, in some embodiments, a function similar to a paper shredder, except that the electronic paper, once erased and/or cleaned, is reusable for further printing. In some embodiments, a reconditioning apparatus may be a stand-alone apparatus, while in some embodiments the reconditioning apparatus may be integrated with a printing apparatus.

Embodiments of the present disclosure include a writing tool that enables electronic paper to be written on using a stylus. The writing tool includes a flat surface onto which the electronic paper is placed, and potentially held into place using mechanical clips, fasteners, friction, electrostatics, or the slight inherent adhesive quality of the flat surface itself. Under the flat surface is an electrode that applies a uniform voltage. A wired stylus applies a different voltage at its tip. When the tip of the stylus is placed into contact with the surface of the electronic paper, a potential voltage is established thereby causing the charged ink particles to rise to the surface. The writing tool may include both a writing mode in which notes or other content may be applied to the surface of the electronic paper. The writing tool may include an erase mode, with a reversed potential, in which the white (or other background color) ink particles are caused to rise to the surface, and the black (or other color) ink particles repelled away from the surface, thereby erasing images previously printed or written onto it. The writing tool may be used with either blank or printed sheets of electronic paper.

Embodiments of the present disclosure include a tracking system. Individual sheets of the electronic paper include a machine-readable code, such as a barcode, that uniquely identifies each sheet of electronic paper. The printer apparatus includes a scanner that scans the machine-readable code. The printer apparatus, a separate tracking system, or both utilize the machine-readable code to track the number of times that a sheet has been printed to. Once a sheet has been printed on a certain number of times, the printer may issue a warning that the sheet has been printed on a threshold number of times, eject the sheet without printing on it, or take some other step to ensure quality control over the number of times a sheet is printed to. The printer may also, in some embodiments, print a code onto a sheet indicating the number of times that the sheet has been printed to, a number of remaining prints allowed, and so forth. Similarly, the system may track the number of times that printer components, such a replaceable printer cartridge (which may include e.g., one or more of the OPC drum, the charge roller, cleaning rollers, discharge rollers, and so forth), have been used to print. The system enforces quality control by limiting the number of sheets that the printer components have printed over a lifetime or other time period. For security and confidentiality purposes, the tracking of sheet usage may not include, in embodiments, tracking the images printed onto the sheets.

As used herein, "voltage" refers to voltages that are with respect to ground, and "voltage differential" refers to voltages that are not with respect to ground, but are with respect to two other voltages. In one example, a first electrode has a voltage of 10V (with respect to ground) and another electrode has a voltage of 12V (with respect to ground), and the voltage differential between them would is 2 V.

Additional examples and details are illustrated in the figures and described below.

FIG. 1 illustrates a cross-sectional view of electronic paper 100 having an electronic ink layer 102. A first polyethylene terephthalate (PET) layer 104, which also includes an anti-glare (AG) layer and hard coat (HC), forms the top of the electronic paper 100. A second PET layer 106, which also includes a hard coat (HC) forms the bottom of the electronic paper 100. A first moisture barrier coating 108 is situated beneath the first PET layer 104, and a second moisture barrier coating 110 is situated above the second PET layer 106. The electronic ink layer 102 is situated between the top layers and the bottom layers of the electronic paper 100. An optically clear adhesive (OCA) 112 enables the top portion to be adhered to the electronic ink layer 102. An edge seal 114 covers the edges of the electronic paper 100 to prevent moisture variation within the electronic ink layer 102.

Various aspects of electronic paper according to embodiments will be described in more detail below.

Figure 2:
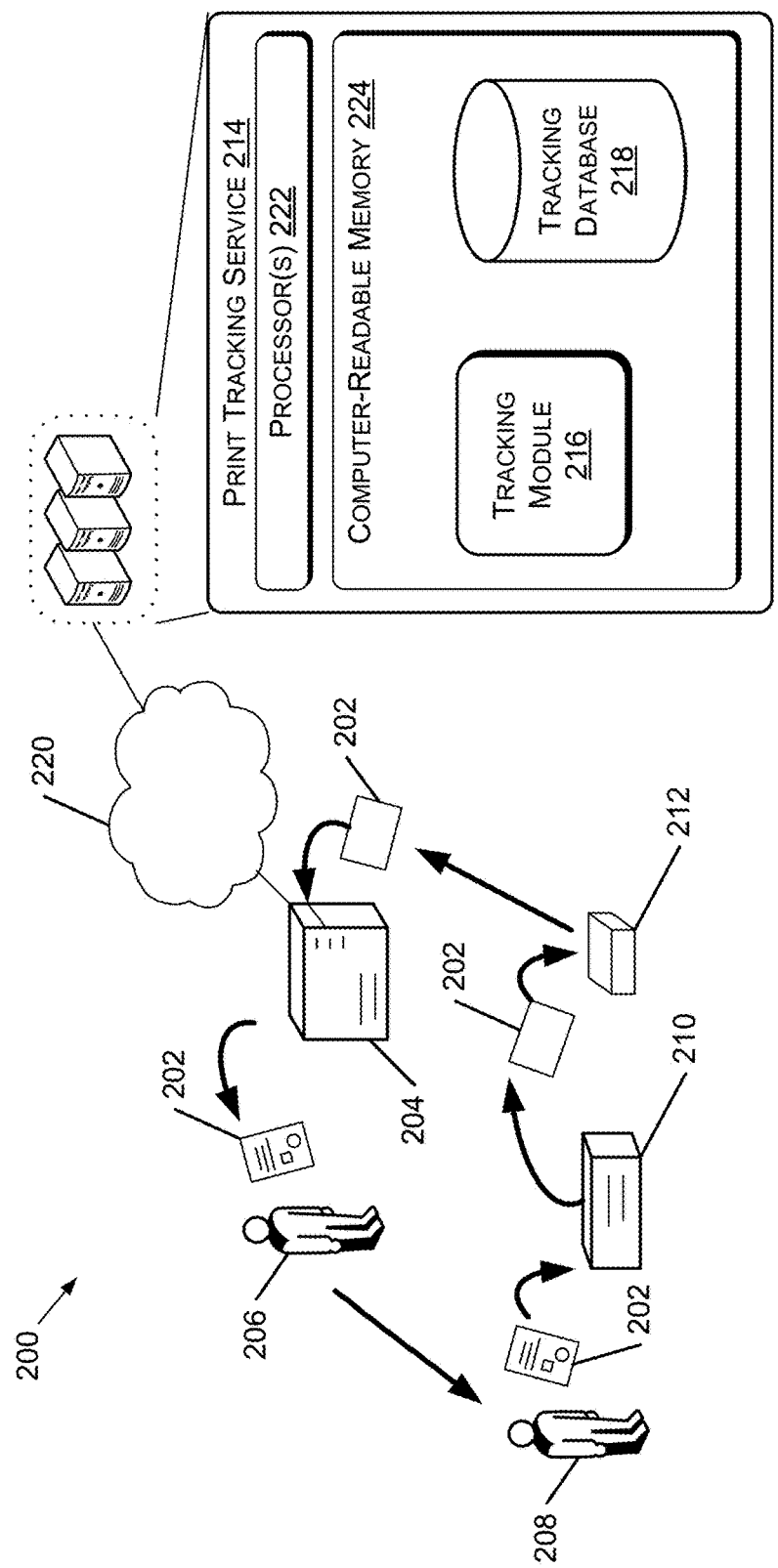
FIG. 2 shows an environment for printing to, reconditioning, and tracking a reusable electrically printable media.

FIG. 2 shows an environment 200 for printing to, reconditioning, and tracking reusable electrically printable media. A sheet 202 of electronic paper may be placed into a printer apparatus 204. As will be described in more detail elsewhere in this Detailed Description, the printer apparatus 204 may clean, discharge, and erase any printed images present on the sheet 202. The printer apparatus 204 selectively applies a voltage differential across a cross-section of the sheet 202 of electronic paper, thereby causing electronic ink therein to selectively rise towards or move away from the surface and create a visible image. A user 206 uses the printed sheet 202 in ways that are similar to pulp-based paper, including for example, giving the printed sheet 202 to another user 208, reading the printed sheet 202, making notes on the printed sheet 202, keeping the printed sheet 202 in a folder for reference, and so forth.

At some point, it may no longer be desired, needed, or useful to keep the sheet 202 in its printed state. Instead of discarding the printed sheet, the sheet 202 is placed into a reconditioning apparatus 210, which cleans the sheet 202 and/or erases the printed image from the sheet 202. The reconditioning apparatus 210 may apply a uniform voltage differential across the sheet 202 to erase the printed image. To clean the sheet, the reconditioning apparatus may utilize sticky rollers, or other mechanisms, to remove dust, dirt, or other debris from the sheet 202. The reconditioning apparatus may utilize a cleaning agent to remove oils from the sheet 202. The reconditioning apparatus may utilize a scanner to detect an amount of use of the sheet 202 and store it in a recycle bin and/or take other action if it reaches the end of its useful life. Once reconditioned, the sheet 202 is placed back into circulation for future printing, for example it may be placed into a stack 212 of sheets, which may then be placed back into the printer apparatus 204, or in another printer apparatus, or discarded/recycled once the sheet 202 reaches the end of its useful life.

In embodiments, the printer apparatus 204, either on its own or in conjunction with a print tracking service 214, tracks usage of the electronic paper sheets. In embodiments the printer apparatus 204, either on its own or in conjunction with a print tracking service 214, also tracks usage of components of the printer apparatus 204. Based on a machine-readable code—such as a bar code, Quick Response (QR) code, or other—on each sheet of electronic paper that uniquely identifies each sheet, the print tracking service 214 and/or the printer apparatus 204 tracks the number of times each sheet has been printed on over a certain period of time, including over a lifetime of the sheet. The machine-readable code may be printed or it may be a permanent feature of the electronic paper sheet 202. The print tracking service 214 and/or the printer apparatus 204 may enforce a threshold number of times that a sheet is printed to, a limited length of time that the sheet may be used over its lifetime, or both. Once a sheet reaches the end of its life, defined by threshold number of times printed to or threshold time period, the printer apparatus 204 may take certain actions to enforce quality control. Such actions include, for example, issuing a warning, refusing to print onto the sheet, printing onto the sheet one last time, printing the image with a watermark to indicate an end-of-life page, print a lower quality image, and so forth. The printer apparatus 204 and/or the print tracking service 214 may include a tracking module 216 and a tracking database 218 to enforce the printing thresholds and to track usage.

The thresholds may be based on observed or inferred lifetime usability of sheets of electronic paper and/or the print components. For example, $90^{th}$, $95^{th}$, $99^{th}$, or other percentile for sheet and/or print components failure may be identified, and thresholds set accordingly. For example, the point at which 99% of sheets (or print components) experience no failure, but 1% of sheets (or print components) do experience failure, may be identified and used to set a threshold for number of times that each sheet may be printed to before the printer apparatus 204 takes a quality control action. Other methods of establishing thresholds may also be used without departing from the scope of embodiments.

The printer apparatus 204 may include one or more functional components that enable the printer apparatus to act as one or more of a printer, a copier, a fax machine, a receipt printer, an industrial plotter, a handheld printer, or other. For example, the printer apparatus 204 functional components may include scanner hardware and/or software components that enable the printer apparatus 204 to scan an image and print the image onto electronic paper sheet 202. The printer apparatus 204 functional components may include a modulator/demodulator (MODEM) and other hardware and software that enable the printer 204 to act as a fax machine, receiving image data over a telephone line and print the image to electronic paper. Other examples are possible without departing from the scope of embodiments.

The printer apparatus 204 may communicate with the print tracking service 214 via a network 220, which may include, in various examples, one or more of a private network, an enterprise network, a campus-wide network, a metropolitan-area network, a virtual private network, the public Internet, and so forth. The print tracking service 214 may be provided as an enterprise-wide service for all printers within a particular organization, such as a school, business, government, government branch, government agency, neighborhood, housing complex, apartment building, and so forth. In some embodiments, the print tracking service may be "cloud-based." In some embodiments, individual sheets of electronic paper, such as sheet 202, may be tracked by the print tracking service 214 no matter where they end up, such as if it is taken from a home to a user's workplace, given by a businessman to a government employee as part of a proposal, and so forth. This may enable the print tracking service 214 to maintain quality control for each sheet across all possible users across its entire lifetime. The tracking of sheet usage may not include, in embodiments, tracking the images printed onto the sheets, thereby ensuring security and confidentiality of the information printed thereon. Tracking of sheet usage, or for printing more generally, may enable new billing or revenue models, such as billing not for the printer or for the paper, but for each individual printing, or other model.

The print tracking service 214 also includes one or more processors 222 and computer-readable memory 224, which are described in more detail elsewhere within this Detailed Description.

Various embodiments of printer apparatus 204 are next described. Electronic paper according to embodiments may be printed on using other types of printer apparatuses besides the example ones illustrated in the figures and described herein. Also, embodiments of the printer apparatuses are not limited to those printer apparatuses described herein.

Figure 3:
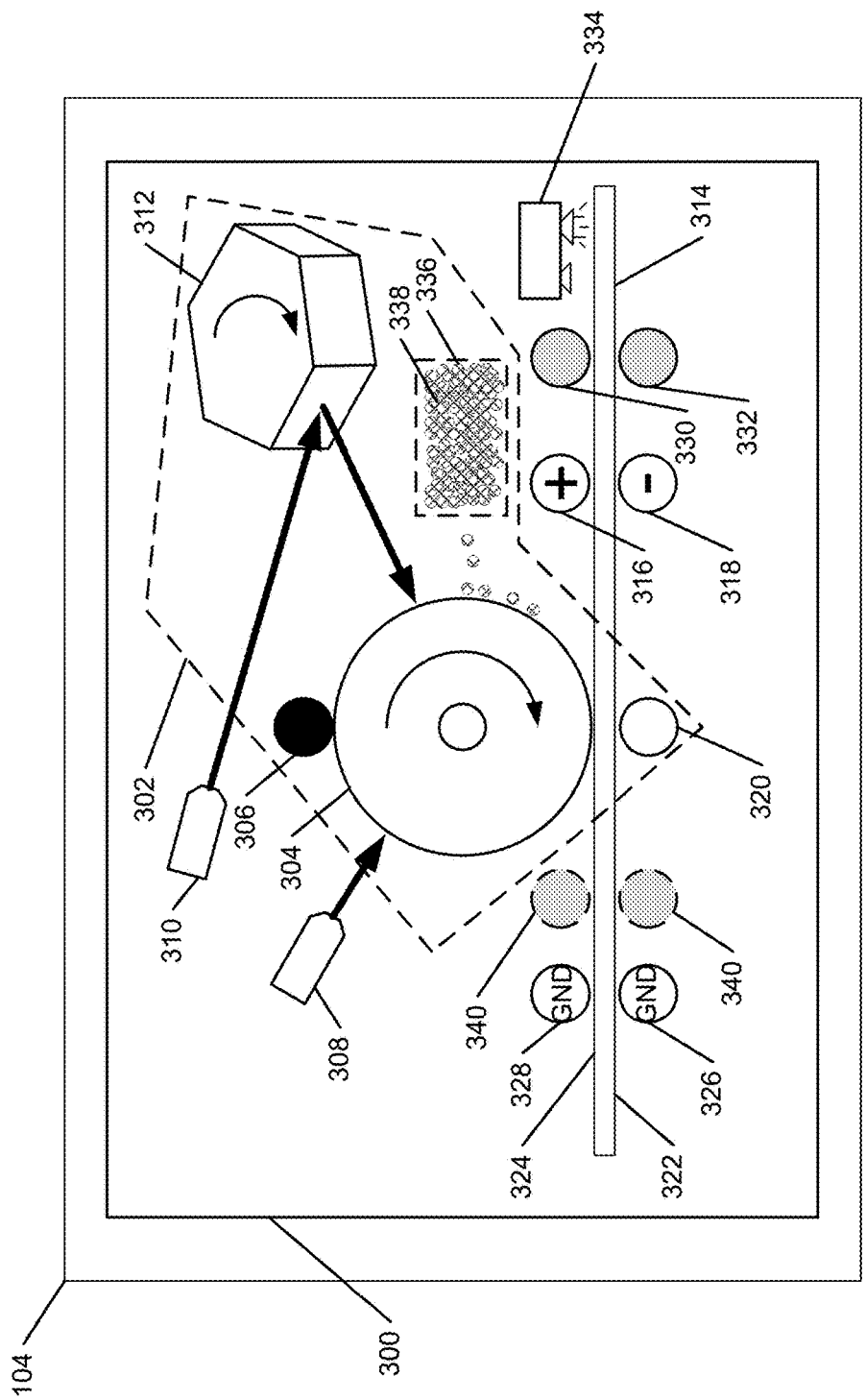
FIG. 3 illustrates a cross-sectional view of components of an electronic paper printer apparatus in accordance with embodiments of the present disclosure.

FIG. 3 illustrates a cross-sectional view of components of an electronic paper printer apparatus 204 in accordance with embodiments of the present disclosure. The printer apparatus 204 includes printer components 300. Some of the printer components 300 may be included in a replaceable cartridge 302 (denoted by a dashed enclosure). Embodiments of the present disclosure may include fewer or more components within a replaceable cartridge that is shown in FIG. 3; and some embodiments may include no replaceable cartridges at all.

The printer apparatus includes an OPC drum 304 and a charge roller 306. A discharge lamp 308 emits light of a suitable wavelength to cause the surface of the OPC drum 304 to become conductive and discharge any charges on the surface of the OPC drum 304. In some embodiments, a discharge roller is utilized to discharge the surface of the OPC drum instead of the discharge lamp 308. The OPC drum 304 rolls in a rotational direction depicted by the arrow in illustrated inside the OPC drum 304. Because FIG. 3 is a cross-section of the printer apparatus 204, a perpendicular length of the OPC drum 304 (which may be thought of as extending into the page and extending outward from the page) is not visible in FIG. 3; the discharge lamp 308 emits light across the all or substantially all of this perpendicular length, thereby discharging any charges upon it.

The charge roller 306 applies a uniform charge across the OPC drum. The printer apparatus 204 selectively controls laser diode 310 according to a pixel map or other image data of an image to be printed. The laser diode 310 emits light in pulses (according to the pixel map or other image data), which is reflected off of polygon mirror 312 onto the OPC drum 304. In some embodiments, a collimating lens is situated between the laser diode 310 and the polygon mirror 312, and another F-theta lens is situated between the polygon mirror 312 and the OPC drum 304 for aberration correction. In some embodiments an LED print head, which includes a light bar with on the order of thousands of LEDs in a linear arrangement, is used to selectively discharge the OPC drum 304. In some embodiments, a rod lens array is integrated with the LED array. The polygon mirror 312 rotates at a rotational rate to cause the pulsed light from the laser diode 310 to scan across the perpendicular surface of the OPC drum, thereby causing portions of the OPC drum to be discharged.

A sheet 314, such as a sheet of electronic paper, is fed through a series of rollers and passed along the rotatable OPC drum 304. One or more of the rollers may be mechanically actuated to provide motive force to feed the sheet 314 through the printer components 300. A pair of erase rollers 316 and 318 erases from the sheet 314 any image that may be present on the sheet. Erasing of the sheet 314 is illustrated in more detail in FIG. 4.

When printing to electronic paper, transfer roller 320 provides a uniform ground voltage, or other bias voltage such as −350V, to the bottom surface 322 of the sheet 314. As portions of the OPC drum 304 come into contact with the top surface 324 of the sheet 314, a voltage differential is selectively applied across the cross-section of the sheet 314, thereby causing colored charged particles of electronic ink to rise towards or move away from the surface of the sheet 314. This is illustrated in more detail in FIG. 4. In embodiments, the transfer roller 320 (or another bias electrode) comes into contact with an embedded conductor in the sheet 314, such as is illustrated in FIGS. 6A, 6B, 8A, 8B, 9A, 9B, 10A, and 10B. Such contact with the embedded conductor may be on one or more side surfaces of the sheet 314, rather than the bottom surface 322. In embodiments, contact with ground or other bias voltage may be applied both to the bottom surface 322 as well as to a side surface.

A pair of discharge rollers 326 and 328 applies a ground voltage to the bottom surface 322 and to the top surface 324 of the sheet 314 to remove any residual charges from those surfaces left during the printing process. In some embodiments, a pair of cleaning rollers 330 and 332 applies a tacky surface to the bottom surface 322 and the top surface 324 of the sheet 314 to remove any dust, dirt, oils, or other debris from those surfaces.

In embodiments, as described elsewhere within this Detailed Description, the printer apparatus 204 tracks sheet usage by reading a machine-readable code on the sheet 314. Scanner 334 scans the machine-readable code and provides the resulting image data to a tracking module, as described in more detail elsewhere within this Detailed Description.

In some embodiments, the printer apparatus is configured to print to both sides of the sheet 314, such as by printing to the top surface 324, feeding the sheet 314 through a mechanism that causes the sheet to be fed back through but in a reverse orientation (i.e., upside down) for printing onto the bottom surface 322.

In some embodiments, the printer apparatus 204 is a multi-function apparatus that is configured to print to pulp-based paper using toner such as in a manner similar to printing in a conventional laser printer. As such, the cartridge 302 may include toner charger 336, which includes toner particles 338. When printing to pulp-based paper or other toner-adherent medium, the toner charger 336 releases charged toner particles 338. The charged toner particles 338 are attracted to the OPC drum 304 in those portions where the OPC drum 304 has been discharged by laser pulses from the laser diode 310, but not to those portions of the OPC drum 304 that remain charged. When printing to a toner-adherent medium, the printer apparatus 204 applies a voltage to the transfer roller 320 to attract the toner to the sheet and pull them from the OPC drum 304. The Fuser rollers 340 apply heat and pressure, thereby causing the toner to melt and adhere to the sheet. In embodiments, the printer apparatus 300 includes a mechanism that feeds or moves electrically printable media back to the erase rollers 316 for electronic ink printing after toner-based printing. The benefit is to have a template, which may be color, generated by toner-based printing and a reusable text area, printed using electronic printing, on the same media. This may be used for, among other things, restaurant menus, church/concert programs, and so forth. Thus, embodiments of the printer apparatus 300 are configured to fuse toner onto plastic, such as electrically printable media.

Figure 4:
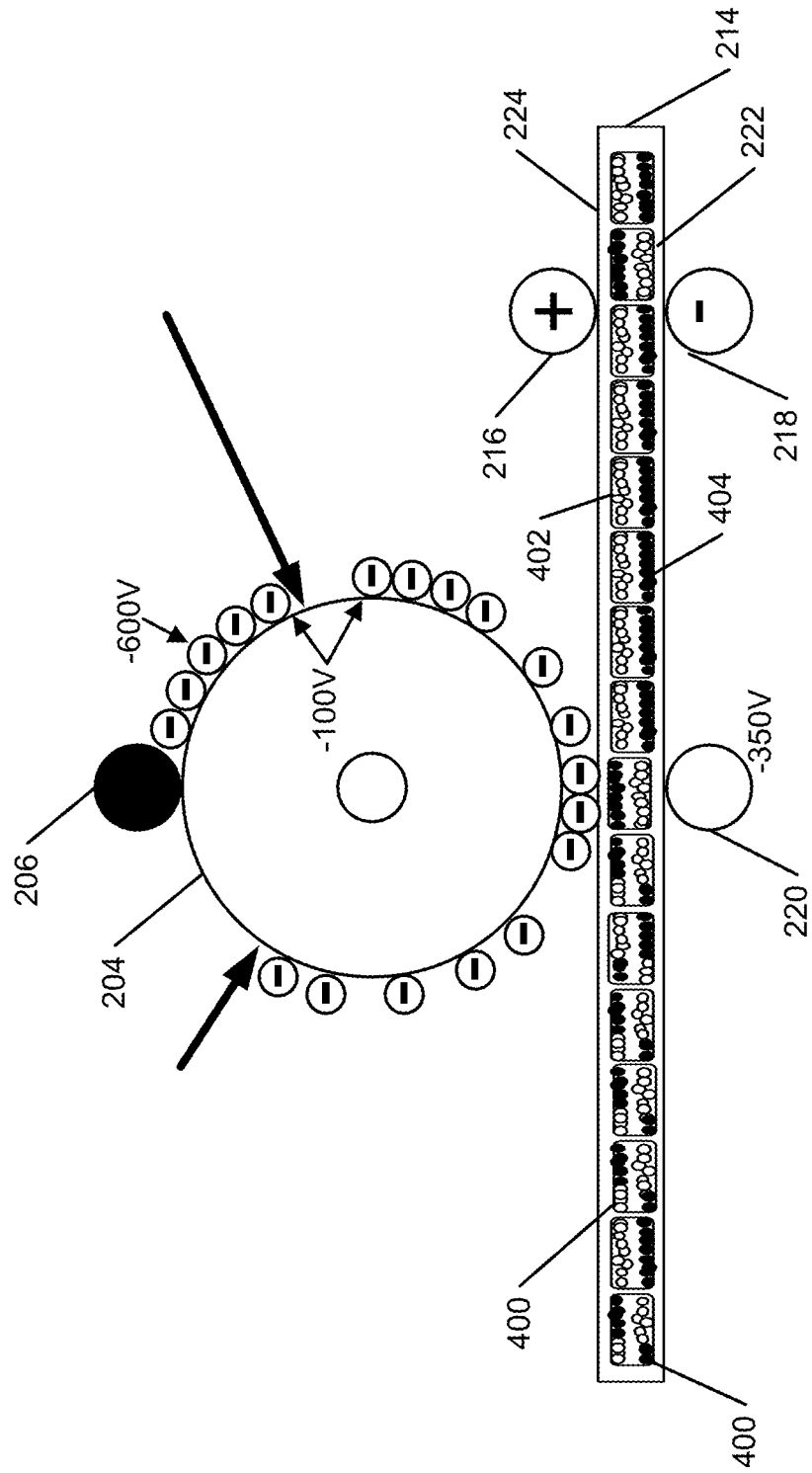
FIG. 4 illustrates a more detailed view of an electronic paper printer apparatus printing onto electronic paper.

FIG. 4 illustrates a more detailed view of an electronic paper printer apparatus 204 printing onto electronic paper. In FIG. 4, the sheet 314 is shown with electronic ink cells 400 visible in the cross-section. The cross section of sheet 314 is not shown to scale, nor is it shown illustrated with all of its layers and components. Electronic ink cells include first colored charged particles 402 and second colored charged particles 404, as well as a transparent fluid, such as an oil, water, solvent, or other. First colored charged particles 402 have a first color (e.g., white) and a first charge (e.g., a negative charge, or relatively lower charge), while second colored charged particles 404 have a second color (e.g., black) and a second charge (e.g., a positive charge, or a relatively higher charge). Other colors besides black and white may also be used without departing from the scope of embodiments. In some embodiments, the fluid in the cells 400 is colored. In some embodiments, structures of the cells 400 are colored.

Prior to printing onto the top surface 324 of the sheet 314, the erase rollers 316 and 318 cause the first colored charged particles 402 to rise towards the top surface 324 of the sheet 314 and the second colored charged particles 404 to descend towards the bottom surface 322 of the sheet 314. This causes any residual image to be erased from the sheet 314 and creates a uniformly colored (in this example, uniformly white) baseline state of the top surface 324 of the sheet 314.

The surface of the OPC drum 304 is charged by charge roller 306. In the example illustrated in FIG. 4, the surface of the OPC drum 304 is charged to a voltage of negative 600 Volts, although other charged voltages may be utilized without departing from the scope of embodiments. The negative surface charge is depicted in FIG. 4 as circles with negative symbols ("−") inside. As light pulses are scanned across the surface of the OPC drum 304 according to a pixel map or other image data, portions of the surface of the OPC drum 304 become conductive and are discharged. In the example shown in FIG. 4, the discharged portions remain at negative 100 Volts, although other discharge voltages may be utilized without departing from the scope of embodiments.

As the sheet 314 passes underneath the rotatable OPC drum 304, the positively charged colored particles—in the example illustrated in FIG. 4, the second colored charged particles 404 (i.e., the black particles)—are attracted to those portions of the OPC drum that remain negatively charged. During the printing process, the second colored particles 404 therefore rise towards the top surface 324 of the sheet 314. The first colored particles 402 are repelled by the portions of the OPC drum 304 that are discharged and tend to move towards or stay near the bottom surface 322 of the sheet 314. In some embodiments, the transfer roller 320 is selected to be a voltage that generates a positive bias of +250V in the discharged area and a negative bias of −250V in the charged area. The first charged colored particles 402 (the white particles) are attracted to those portions of the OPC drum 304 that are discharged and move towards or stay near the top surface 324 of the sheet 314, and are repelled by those portions of the OPC drum 304 that remain charged, and tend to move towards the bottom surface 322 of the sheet 314. This printing process creates an image that corresponds to the pixel map or other image data used to generate the pulses of light from the laser diode 301 illustrated in FIG. 3.

Next will be described various embodiments of electronic paper embodiments. In various embodiments, the electronic paper includes structural layers. In some embodiments, the structural layers include flexible plastic layers, such as polyethylene terephthalate (PET) or other flexible plastic. In these embodiments, a moisture barrier, which may comprise of a transparent coating or membrane, including silicon oxide ($SiO_x$), Aluminum Oxide ($Al_2O_3$), polyethelene, polypropylene, or other material that prevents or retards vapor transmission through its cross-section, is applied to the flexible plastic layers. In some embodiments, the structural layers include thickened moisture barrier layers, as will be discussed in more detail below. In some embodiments, Ultra-violet cut (UV-cut) material may be included to protect the electronic ink layer within the electronic paper. One embodiment is to have a UV-cut material built into PET film base to cut or filter out the UV light and protect the ink layer.

FIGS. 5A and 5B illustrate, respectively, a cross-sectional view of electronic paper 500 having a flexible plastic layer, a moisture barrier, and an electronic ink layer, and a process 502 for manufacturing the electronic paper. The order of application of the layers of the electronic paper 500 (shown with circled numerals indicating order of application) is shown in FIG. 5B for illustrative purposes only; the electronic paper 500 may be manufactured in different ways without departing from the scope of embodiments. A moisture barrier 504 is applied to a transparent flexible plastic layer 506, such as by deposition, fusing, or other process (shown with a circled "1"). Separately, a moisture barrier 508 is applied to another flexible plastic layer 510 in a same or similar fashion (shown with a circled "2"). In some embodiments, one or both of the flexible plastic layer 506 and the flexible plastic layer 510 may be polyethylene terephthalate (PET), although other transparent flexible plastic may be used without departing from the scope of embodiments. In the embodiments illustrated in FIGS. 5A and 5B, moisture barrier 504 and moisture 508 include a transparent coating or membrane, such as silicon oxide ($SiO_x$), Aluminum Oxide ($Al_2O_3$), polyethelene, polypropylene, or other material that prevents or retards vapor transmission through its cross-section.

An anti-glare layer or coating, an anti-reflective layer or coating, or an anti-glare/anti-reflective (AG/AR) layer or coating, as used herein, includes a material to reduce glare and/or reflection from an outside light source. A coating, such as an anti-glare coating, an anti-reflective coating, or an AG/AR coating (referred to herein as an AG/AR coating 514 for the sake of convenience only) is applied to the top of the flexible plastic layer 510 (shown with a circled "3"), and a scratch-resistant hard coat 516 is applied on top of the AG/AR coating 514 (shown with a circled "4"). Anti-glare coatings, such as the AG/AR coating 514 and other anti-glare coatings described herein, may utilize any number of antireflective or anti-glare coating types, including those that utilize index matching, single-layer or multi-layer interference, absorbing, circular polarizing, and so forth. In some embodiments, anti-glare coatings use diffusion mechanisms to break up light reflected off of the surface of the electronic paper. Diffusing the light reduces the coherence of a reflected image, making it unfocused and thereby reducing its interference with viewing the underlying image in the electronic paper. The anti-glare coatings used in some embodiments utilize mechanically or chemically textured surfaces, or contain suspended particles, to diffuse reflected light and reduce glare. In some embodiments, an anti-reflective coating may be used instead of, or in addition to, an anti-glare coating. As used herein, an anti-reflective coating is a multi-layer coating that bends light as it passes through the anti-reflective coating, thereby counteracting the refraction that light naturally experiences when it passes from one medium to another, such as from air to plastic, or vice versa. Such refraction might substantially reduce the amount of transmitted light, thereby making the printed image difficult to see. But an anti-reflective coating can, in some instances, increase total light transmission up to 99%.

A hard coat material, as used herein, includes a film or coating that creates a permanent bond with the material it is applied to, and prevents or reduces the appearance of scratches on the surface of the electronic paper. The anti-glare layer and hard coat are, in some embodiments, implemented together. One example is Acrylic mixed with $S_iO_2$ coated on top of the PET layer. The $S_iO_2$ particles in the Acrylic provide the profile that scatters and diffuses the light. The thickness of the combined coating could be 3 microns to 50 microns. The hardness measurement is typically measured by abrasive test (with steel wool) and pencil hardness test. Regarding the pencil hardness test, the hardness of electrically printable media according to embodiments may be between 3H to 9H, or other hardness.

An electronic ink layer 512, which includes ink cells, is coated or fabricated on top of the moisture barrier 504 (shown with a circled "5"). The electronic ink layer 512 includes in some embodiments a plurality of cells with charged colored particles suspend in a fluid as described in more detail elsewhere within this Detailed Description.

An optically clear adhesive 520 is applied onto the moisture barrier 508 (shown with a circled "6"), and the top portion of the electronic paper 500 (including the moisture barrier 508, the flexible plastic layer 510, the AG/AR coating 514, and the hard-coat 516) is laminated onto the electronic ink layer 512 (shown with a circled "7") through the optically clear adhesive (OCA) layer 520. An edge seal 518 is applied to all four of the side edges of the electronic paper 500 (shown with circled "8"). An edge seal, as used herein, includes any bonding agent between substrates of different physical properties to form a seal between the materials. An edge seal may also seal against vapor transmission, similar to the moisture barrier 504. The moisture barrier 504, moisture barrier 508, and the edge seal 518 prevent the moisture level in the electronic ink layer 512 from varying.

In some embodiments, the bottom flexible plastic layer 506 and/or the moisture barrier 504 may be translucent or non-transparent, rather than transparent, so that a "negative" of the printed image is not visible from the bottom surface of the electronic paper 500. For example, a layer may be colored white in order to appear similar to the bottom of conventional pulp-based paper. In some embodiments, another thin non-transparent layer may be placed on the bottom of the flexible plastic layer 506 in order to achieve the same result. A hard coat may also be applied to the bottom of the flexible plastic layer 506.

FIGS. 6A and 6B illustrate, respectively, a cross-sectional view of electronic paper 600 having a conductive layer to assist with electronic printing, and a process 602 for manufacturing the electronic paper. The order of application of the layers of the electronic paper 600 (shown with circled numerals indicating order of application) is shown in FIG. 6B for illustrative purposes only; the electronic paper 600 may be manufactured in different ways without departing from the scope of embodiments.

Electronic paper 600 includes moisture barrier 504, flexible plastic layer 506, moisture barrier 508, flexible plastic layer 510, the electronic ink layer 512, the AG/AR coating 514, and the hard coat 516. In addition, electronic paper 600 also includes a thin conductor layer 604. The conductor layer 604 may include a transparent conductor fabricated from organic or inorganic materials. An inorganic transparent conductor may include a layer of transparent conducting oxide (TCO), which may include indium tin oxide (ITO), fluorine doped tin oxide (FT), doped zinc oxide, and others. An organic transparent conductor may include carbon nanotubes, graphene, or other. At least one portion 606 of the conductor 604 extends outward from the side of the electronic paper 600. Additional conductive exposures may also be included, on the same edge or on different edges of the electronic paper 600. In the embodiments illustrated in FIGS. 6A and 6B, moisture barrier 504 and moisture 508 include a transparent coating or membrane, such as silicon oxide ($SiO_x$), Aluminum Oxide ($Al_2O_3$), polyethelene, polypropylene, or other material that prevents or retards vapor transmission through its cross-section.

The conductor 604, which may be less than a micron thick, substantially covers a bottom portion of the electronic ink layer 512. The conductor 604 and/or the portion 606 may be plated, coated, applied with a durable conductive material, such as Copper, Silver, Copper tape, Silver paste, and so forth, which may extend the useful life of the electronic paper 600. The conductor 604 may, during the printing process—such as during the printing process employed by printer apparatus 204—come into contact with a transfer roller or other electrode of the printer apparatus. The conductor 604, when in contact with the transfer roller or other electrode of the printer apparatus through portion 606, provides ground (or other) voltage directly beneath the electronic ink layer 512. This placement may be more effective than applying a differential across the entire cross section of the electronic paper (as in electronic paper 500). Alternatively, or in addition, this placement may enable lower voltages to be used in order to achieve the same or similar level of performance, thereby improving safety, production costs, and/or operational costs of the printer apparatus, reconditioning apparatus, or writing tool.

To fabricate the electronic paper 600, the conductor 604 is applied to the flexible plastic layer 506 (shown with a circled "1"). The moisture barrier 504 is coated on the conductor 604 (shown with a circled "2") The electronic ink layer 512, which includes ink cells, is coated or fabricated on top of the moisture barrier 504 (shown with a circled "3"). The moisture barrier 508 is applied to another flexible plastic layer 510 (shown with a circled "4"). The AG/AR coating 514 is applied to the top of the flexible plastic layer 510 (shown with a circled "5"), and a scratch-resistant hard coat 516 is applied on top of the AG/AR coating 514 (shown with a circled "6").

An optically clear adhesive 520 is applied onto the moisture barrier 508 (shown with a circled "7"), and the top portion of the electronic paper 500 (including the moisture barrier 508, the flexible plastic layer 510, the AG/AR coating 514, and the hard-coat 516) is laminated onto the electronic ink layer 512 (shown with a circled "8") through the optically clear adhesive (OCA) layer 520. The edge seal 518 is applied to all four of the side edges of the electronic paper 500 (shown with a circled "9").

Conventional pulp-based paper is on the order of 100 microns in cross-sectional thickness. The electronic paper 500 illustrated in FIG. 5A, and electronic paper 600 of FIG. 6A, may be on the order of 200 microns in thickness, with the flexible plastic layers 506 and 510 being approximately 50 microns each, the moisture barriers 504 and 508 being 8-10 microns each, the OCA layer 520 being 50 microns, and the other layers adding up to reach a total approximate thickness, in some embodiments, of 200 microns. A hard coat may also be applied to the bottom of the flexible plastic layer 506.

To reduce the thickness, the flexible plastic layers and moisture barrier layer may be eliminated, as shown in FIGS. 7A and 8A.

FIGS. 7A and 7B illustrate, respectively, a cross-sectional view of electronic paper 700 excluding a flexible plastic layer, and a process 702 for manufacturing the electronic paper. The order of application of the layers of the electronic paper 700 (shown with circled numerals indicating order of application) is shown in FIG. 7B for illustrative purposes only; the electronic paper 700 may be manufactured in different ways without departing from the scope of embodiments.

In the embodiments illustrated in FIGS. 7A and 7B, moisture barrier film 704 is a polymer film with an embedded moisture barrier or a polymer film that is an intrinsic vapor/moisture blocker, such as Cyclic Olefin Copolymer (COC), Cyclic Olefin Polymer (COP), or other. The moisture barrier film 704 forms the bottom portion of electronic paper 700 and provides bulk and structure to the electronic paper 700. An electronic ink layer 706 is coated or fabricated on top of the moisture barrier 704 (shown with circled "1"). An AG/AR coating 710 (which may be the same as or similar to the AG/AR coating 514) is applied to another moisture barrier film 708 (shown with a circled "2"). A hard coat 712 (which may be the same as or similar to the hard coat 516) is applied on top of the AG/AR coating (shown with a circled "3"). An optically clear adhesive (OCA) 716 is applied onto the moisture barrier 708 (shown with a circled "4"). The top portion of the electronic paper 700 (including the moisture barrier 708, the AG/AR coating 710, and the hard coat 712) is laminated on top of the electronic ink layer 706 (shown with a circled "5") through OCA 716. An edge seal 714 is applied to all four of the side edges of the electronic paper 700 (shown with circled "6").

In contrast to the moisture barriers 504 and 508 in electronic paper 500 and 600, moisture barrier films 704 and 708 may be on the order of 50 microns each in thickness, making electronic paper 700 thinner than electronic paper 500 and 600 due to the integrated moisture barrier film 704 and 708. A hard coat may also be applied to the bottom of the moisture barrier film 704.

FIGS. 8A and 8B illustrate, respectively, a cross-sectional view of electronic paper 800 excluding a flexible plastic layer and including a conductive layer to assist with electronic printing, and a process 802 for manufacturing the electronic paper. The order of application of the layers of the electronic paper 800 (shown with circled numerals indicating order of application) is shown in FIG. 8B for illustrative purposes only; the electronic paper 800 may be manufactured in different ways without departing from the scope of embodiments.

Electronic paper 800 includes moisture barrier 704, electronic ink layer 706, moisture barrier 708, the AG/AR coating 710, the hard coat 712, and the edge seal 714. In addition, electronic paper 800 also includes a conductor 804, which may be less than a micron thick. At least one portion 806 of the conductor 804 protrudes outward from side of the electronic paper 800, and exposed outside of the edge seal 714. Additional conductive exposures may also be included, on the same edge or on different edges of the electronic paper 800. The conductor 804 substantially covers the bottom portion of the electronic ink layer 706.

To fabricate the electronic paper 800, the conductor 804 is applied to the moisture barrier film 704 (shown with a circled "1"). The electronic ink layer 706, which includes ink cells, is coated or fabricated on top of the conductor 804 (shown with a circled "2"). The AG/AR coating 710 is applied to the top of the moisture barrier film 708 (shown with a circled "3"), and a scratch-resistant hard coat 712 is applied on top of the AG/AR coating 710 (shown with a circled "4"). An optically clear adhesive 716 is applied onto the moisture barrier film 708 (shown with a circled "5"). The top portion of the electronic paper 800 (including the moisture barrier film 708, the AG/AR coating 710, and the hard-coat 712) is laminated onto the electronic ink layer 706 (shown with a circled "6") through the optically clear adhesive (OCA) layer 716. The edge seal 714 is applied to all four of the side edges of the electronic paper 800 (shown with circled "7").

As with electronic paper 600, the conductor 804 of electronic paper 800 may, during the printing process—such as during the printing process employed by printer apparatus 204—come into contact with a transfer roller or other electrode of the printer apparatus. This may improve one or more of printing performance, safety, and power consumption.

Figure 9A:
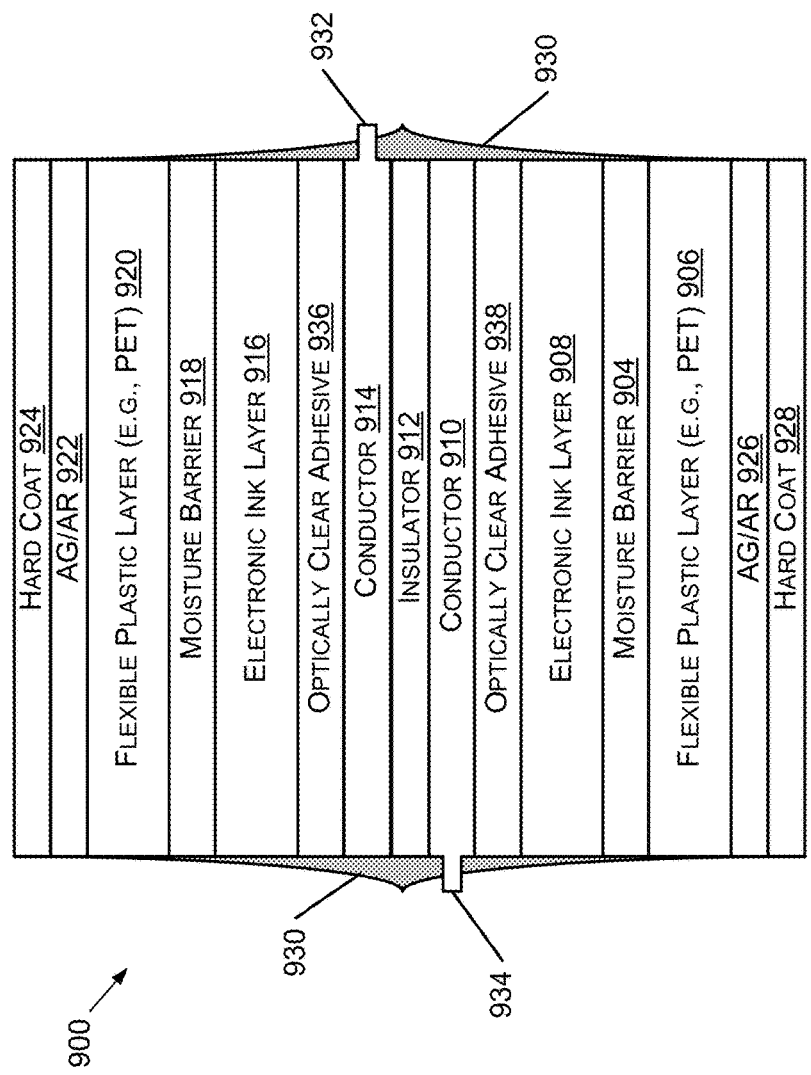
FIGS. 9A and 9B illustrate, respectively, a cross-sectional view of double-sided electronic paper having a flexible plastic layer, and a process for manufacturing the electronic paper.
Figure 9B:
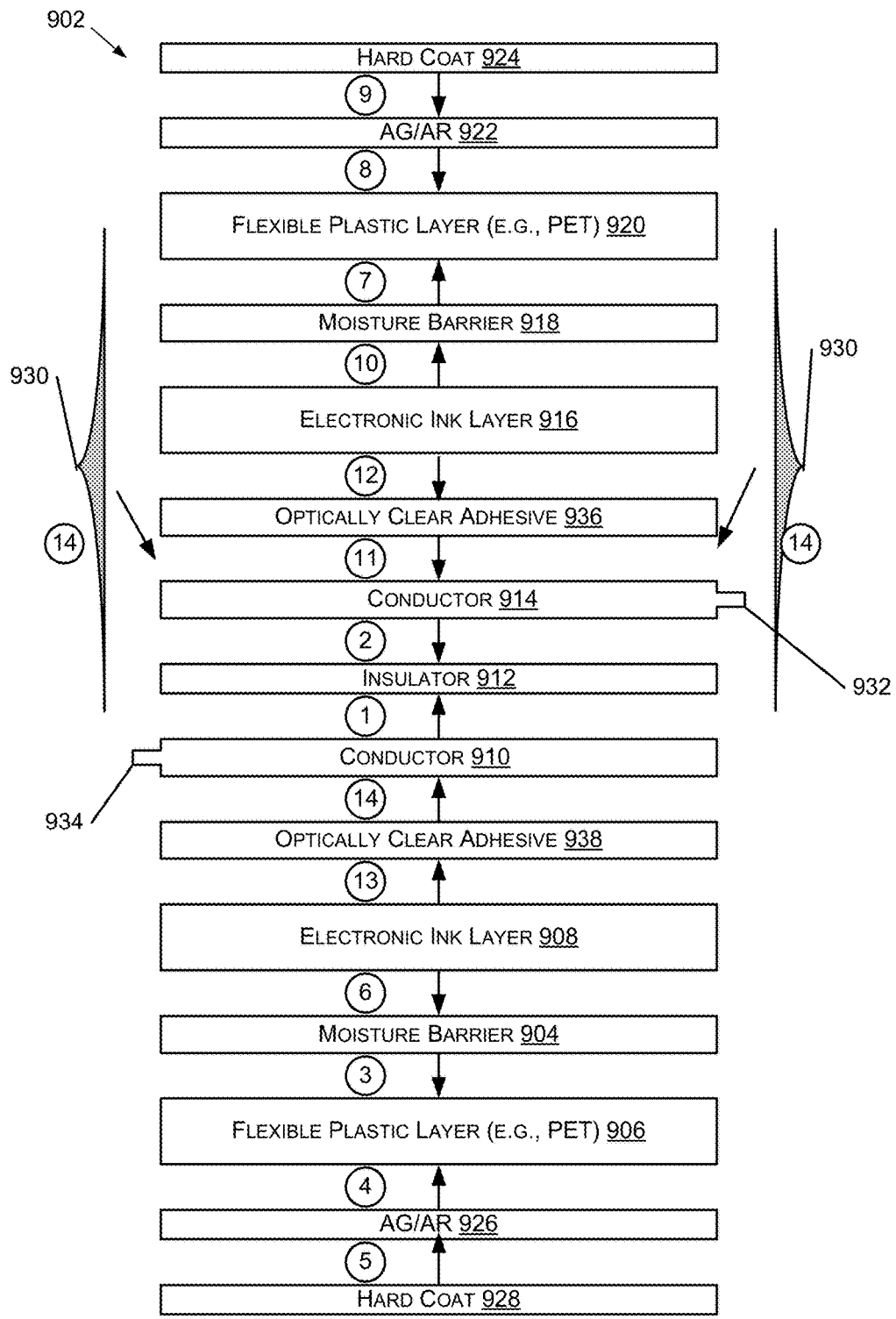

FIGS. 9A and 9B illustrate, respectively, a cross-sectional view of double-sided electronic paper 900 having a flexible plastic layer, and a process 902 for manufacturing the electronic paper. The order of application of the layers of the electronic paper 900 (shown with circled numerals indicating order of application) is shown in FIG. 9B for illustrative purposes only; the electronic paper 900 may be manufactured in different ways without departing from the scope of embodiments.

A conductor 910 is sputtered on one side of an insulator 912 (shown with a circled "1") and another conductor 914 sputtered on the other side of the insulator 912 (shown with a circled "2"). The insulator 912 may include any opaque, electrically insulating material, such as composite polymer materials, which may have flexible properties. The conductors 910 and 914 may each be less than a micron thick.

To make a bottom stack, a moisture barrier 904 is applied to the top of a flexible plastic layer 906, such as by deposition, fusing, or other process (shown with a circled "3"). AG/AR coating 926 is applied to the flexible plastic layer 906 (shown with a circled "4") and hard coat 928 is applied to the AG/AR coating 926 (shown with a circled "5"). An electronic ink layer 908 is coated or fabricated on top of the moisture barrier 904 (shown with a circled "6").

To make a top stack, another moisture barrier 918 is applied to another flexible plastic layer 920 (shown with a circled "7"). AG/AR coating 922 is applied on top of the flexible plastic layer 920 (shown with a circled "8") and a hard coat 924 is applied on top of the AG/AR coating 922 (shown with a circled "9"). An electronic ink layer 916 is coated or fabricated on bottom of the moisture barrier 918 (shown with a circled "10").

An optically clear adhesive (OCA) 936 is applied to the conductor layer 914 (shown with a circled "11") and the top stack is bonded to the conductor layer 914 through the OCA 936 (shown with a circled "12"). An OCA 938 is applied to the conductor 910 (shown with a circled "13") and the bottom stack is bonded to the conductor layer 910 through the OCA 938 (shown with a circled "13").

An edge seal 930 is applied to the edges of the electronic paper 900 (shown with circled "14"). Portions 932 and 934 of the conductors 914 and 910, respectively, extend outward from side of the electronic paper 900, exposed outside of the edge seal 930. Additional exposures may also be included, on the same edge or on different edges of the electronic paper 900. Conductors 932 and 934 may be plated, coated, applied with a durable conductive material, such as copper, silver, copper tape, silver paste, and so forth, which may extend the usable life of the electronic paper 900.

The flexible plastic layers 906 and 920 may be, in some embodiments, polyethylene terephthalate (PET), although other materials may also be used in some embodiments.

To enable double-sided printing onto electronic paper 900, a printer apparatus may apply ground voltages or other voltages to the edges of electronic paper 900, on the exposed portions 932 and 934 during the printing process rather than on the underside of the electronic paper 900. The insulator 912 provides an opaque and uniform background, lessens or eliminates the impact that printing on one side of the electronic paper 900 might otherwise have on the electronic ink layer on the opposite side of the electronic paper 900. The insulator 912 or some other layer of the electronic paper may be translucent or opaque in order to prevent images on one side of the electronic paper from being visible on the other side of the electronic paper 900.

Because double-sided versions of electronic paper, as in electronic paper 900, require additional layers, the thicknesses of the double-sided paper may be greater than single-sided electronic paper. The flexible plastic layers may be omitted in some embodiments to reduce the thicknesses. As previously described, the flexible plastic layers 906 and 920 may be on the order of 50 microns in width each, while the moisture barriers 904 and 918 may be on the order of 8-10 microns. In the embodiments illustrated in FIGS. 9A and 9B, moisture barrier 918 and moisture 904 include a transparent coating or membrane, such as silicon oxide ($SiO_x$), Aluminum Oxide ($Al_2O_3$), polyethelene, polypropylene, or other material that prevents or retards vapor transmission through its cross-section.

Figure 10B:
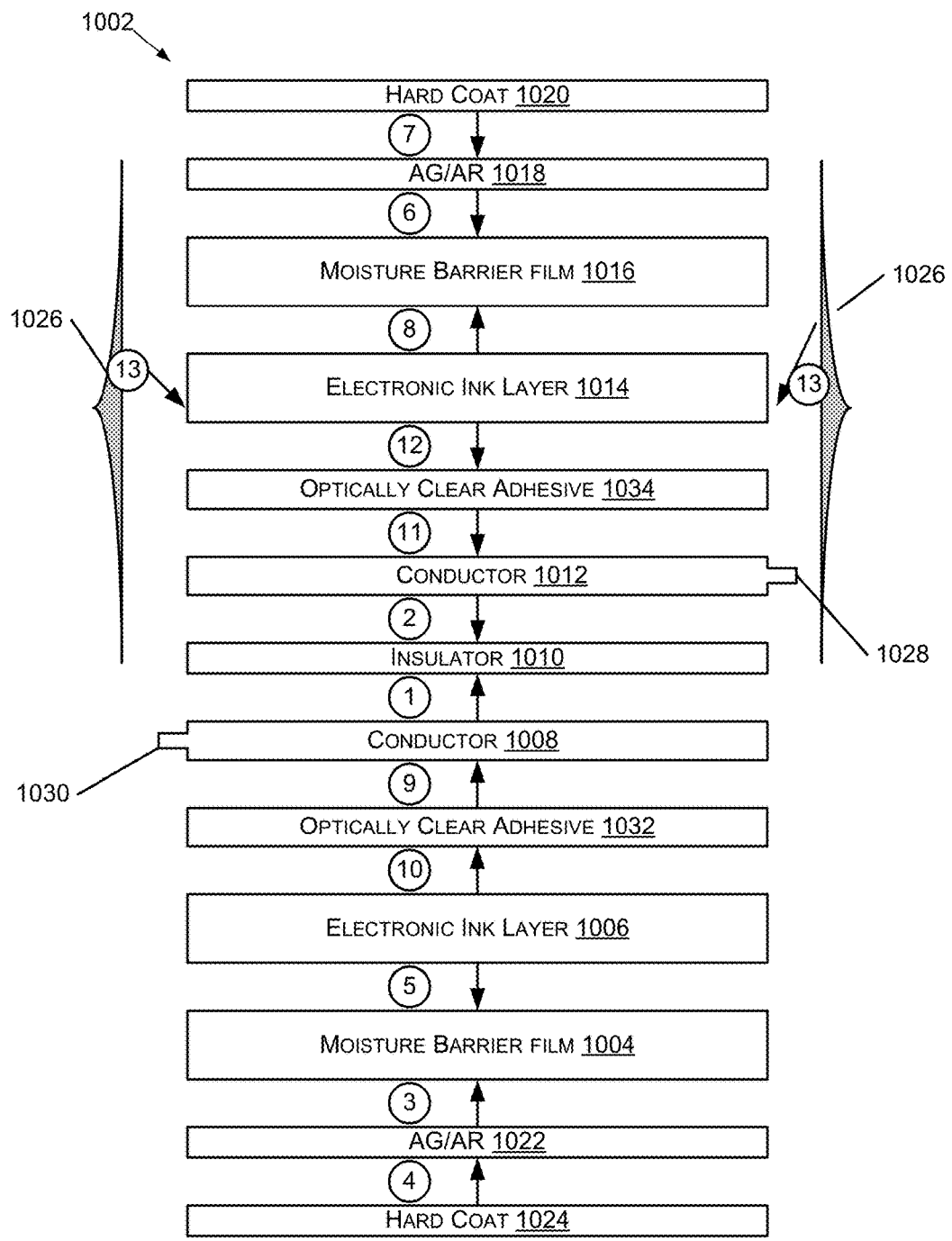

FIGS. 10A and 10B illustrate, respectively, a cross-sectional view of double-sided electronic paper 1000 excluding a flexible plastic layer, and a process 1002 for manufacturing the electronic paper. The order of application of the layers of the electronic paper 1000 (shown with circled numerals indicating order of application) is shown in FIG. 10B for illustrative purposes only; the electronic paper 1000 may be manufactured in different ways without departing from the scope of embodiments.

A conductor 1008 is sputtered on one side of an insulator 1010 (shown with a circled "1") and another conductor 1012 sputtered on the other side of the insulator 1010 (shown with a circled "2"). The insulator 1010 may include any opaque, electrically insulating material, such as composite polymer materials, which may have flexible properties. The conductors 1008 and 1012 may each be less than a micron thick.

A moisture barrier film 1004 is a polymer film with an embedded moisture barrier or a polymer film that is an intrinsic vapor/moisture blocker. To make a bottom stack, the moisture barrier film 1004 is formed, an AG/AR coating 1022 is applied to the moisture barrier 1004 (shown with a circled "3") and hard coat 1024 is applied on top of the AG/AR coating 1022 shown with a circled "4"). An electronic ink layer 1006 is coated or fabricated onto the moisture barrier film 1004 (shown with a circled "5").

To make a top stack, another moisture barrier film 1016 is formed, an AG/AR coating 1018 is applied to the moisture barrier 1016 (shown with a circled "6") and a hard coat 1020 applied on top of the AG/AR coating 1018 (shown with a circled "7"). An electronic ink layer 1014 is coated or fabricated onto the moisture barrier film 1016 (shown with a circled "8").

An optically clear adhesive (OCA) 1032 is applied to the conductor layer 1008 (shown with a circled "9") and the bottom stack is bonded to the conductor layer 1008 through the OCA 1032 (shown with a circled "10"). An OCA 1034 is applied to the conductor 1012 (shown with a circled "11")

and the top stack is bonded to the conductor layer 1012 through the OCA 1034 (shown with a circled "12").

An edge seal 1026 is applied to the edges of the electronic paper 1000 (shown with a circled "13"). Portions 1028 and 1030 of the conductors 1012 and 1008, respectively, extend outward from the side of the electronic paper 1000, exposed outside of the edge seal 1026. Additional exposures may also be included, on the same edge or on different edges of the electronic paper 1000.

As with electronic paper 900, to enable double-sided printing onto electronic paper 1000, a printer apparatus may apply ground voltages to the edges of electronic paper 1000, on the exposed portions 1028 and 1030 during the printing process rather than on the underside of the electronic paper 1000. The insulator 1010 lessens or eliminates the impact that printing on one side of the electronic paper 1000 might otherwise have on the electronic ink layer on the opposite side of the electronic paper 1000. The insulator 1010 or some other layer of the electronic paper may be translucent or opaque in order to prevent images on one side of the electronic paper from being visible on the other side of the electronic paper 1000.

The moisture barriers 1004 and 1016 may be thicker than in electronic paper 900, and may be on the order of 40 microns each, instead of a thinner 8-10 microns. However, elimination of the flexible plastic layers reduces the thicknesses of electronic paper 1000 according to embodiments illustrated in FIGS. 10A and 10B, compared with the thicknesses of electronic paper 900 illustrated in FIGS. 9A and 9B.

Figure 11:
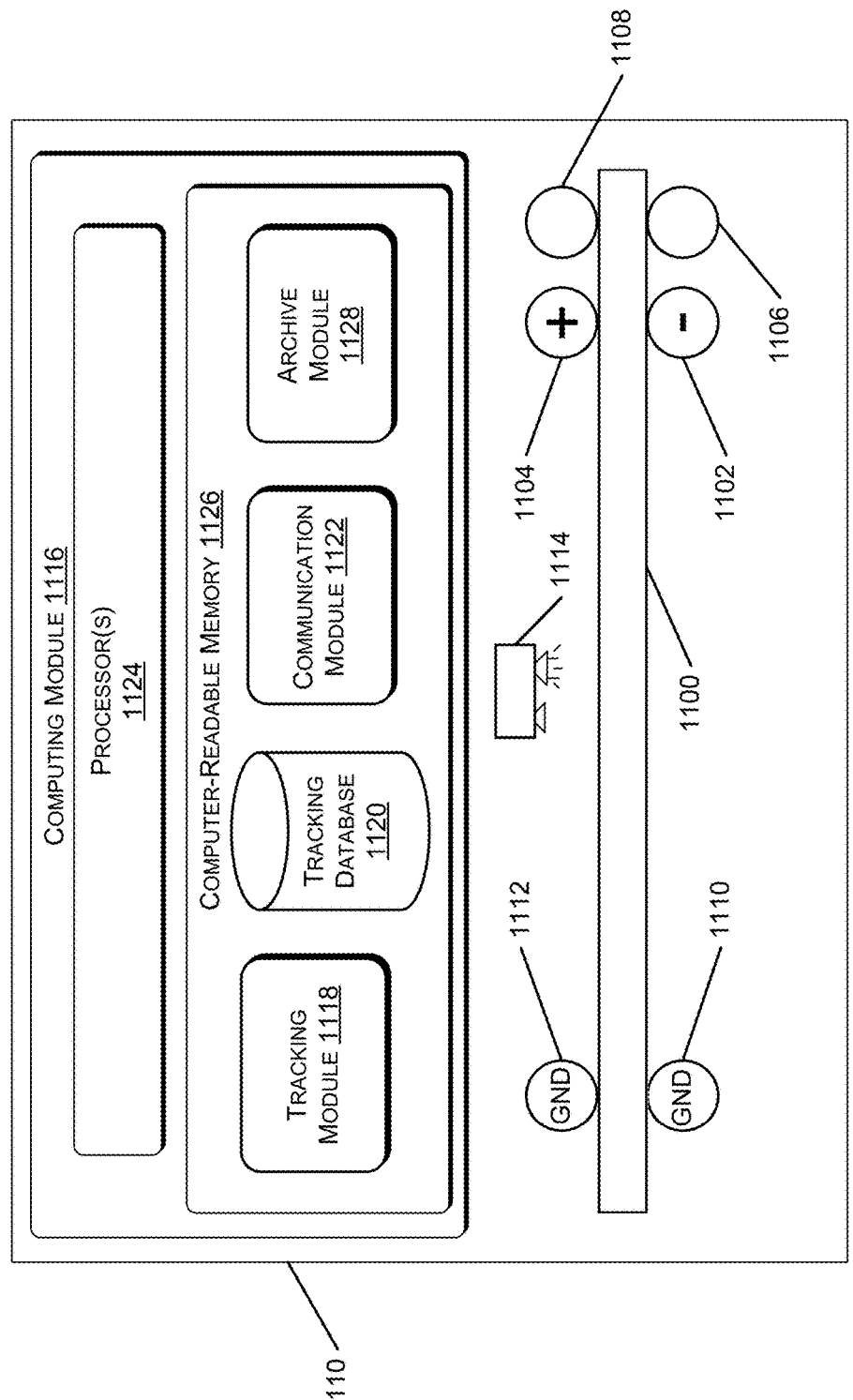
FIG. 11 shows a block diagram illustrating a reconditioning apparatus suitable to clean and erase electronic paper for re-use.

FIG. 11 shows a block diagram illustrating a reconditioning apparatus 210 suitable to clean and erase electronic paper 1100 for re-use. The electronic paper 1100 is fed through a series of rollers. One or more of the rollers may be mechanically actuated to provide motive force to feed the electronic paper 1100 through the reconditioning apparatus 210. A pair of erase rollers 1102 and 1104 erases from the electronic paper 1100 any image that may be present, in a way that is similar to or the same as the pair of erase rollers 316 and 318 in FIG. 3. In some embodiments, a pair of cleaning rollers 1106 and 1108 apply a tacky surface to the bottom surface and the top surface of the electronic paper 1100 to remove any dust, dirt, oils, or other debris from those surfaces. A pair of discharge rollers 1110 and 1112 applies a ground voltage to the bottom surface and to the top surface of the electronic paper 1100 to remove any residual charges from those surfaces left during the erasing process. Where double-sided electronic paper is used, the paper may be fed twice through the system in some embodiments. In some embodiments, two sets of erase electrodes may be employed to erase both sides of the electronic paper at the same time. For example, the erase rollers may include two positively charged rollers (instead of one positively charged roller and one negatively charged roller) and side-positioned electrodes may be negatively charged in order to erase both sides at the same time. Similarly, for single-sided electronic paper that includes a conductor layer, side-positioned electrodes may be used to apply the negative or ground voltages to establish the electric field for erasing.

In some embodiments, the reconditioning apparatus 210 may include a scanner 1114, which may be the same as or similar to the scanner 334 in FIG. 3. A computing module 1116 may include a tracking module 1118 (which may similar to the tracking module 216 of FIG. 2) in communication with the scanner 1114 to scan a unique machine-readable code on the electronic paper 1100.

The tracking module 1118 may track the usage of sheets of electronic paper, such as the electronic paper 1100, using a tracking database 1120 (which may be similar to the tracking database 218 of FIG. 2). A communication module 1122 may be in communication with a print tracking service (such as the print tracking service 214 of FIG. 2), or with the printer apparatus 204, via a network connection (such as the network 220 of FIG. 2) which may store a number of erase instances for the electronic paper 1100. Thus, in embodiments, tracking of the usage of electronic paper may be done at the erase stage, at the printing stage, or both. Where the tracking module 1118 determines (either from the tracking database 1120, from a print tracking service, or from the printer apparatus 204) that the electronic paper 1100 has reached a threshold number of prints and/or erasures, it may cause the reconditioning apparatus to output a warning, refuse to erase the electronic paper, or take other action to enforce a threshold usage of the electronic paper.

The reconditioning apparatus 210 also includes one or more processors 1124 and computer-readable memory 1126, which are described in more detail elsewhere within this Detailed Description. Although the reconditioning apparatus 210 is shown as a device that both erases and cleans, other embodiments may utilize separate devices to clean and/or erase the electronic paper. In some embodiments, a printer apparatus may clean and/or erase the electronic paper prior to printing. The computing module 1116 also includes an archive module 1128 that stores the scanned data images, including any notes made thereto; the image may be scanned by the scanner 1114. The archived images may be stored in the tracking database 1120 or in a different database on the computing module 1116, or elsewhere. The scanning of the image for archiving purposes may be accomplished at the same time that the machine-readable code is also scanned.

Figure 12A:
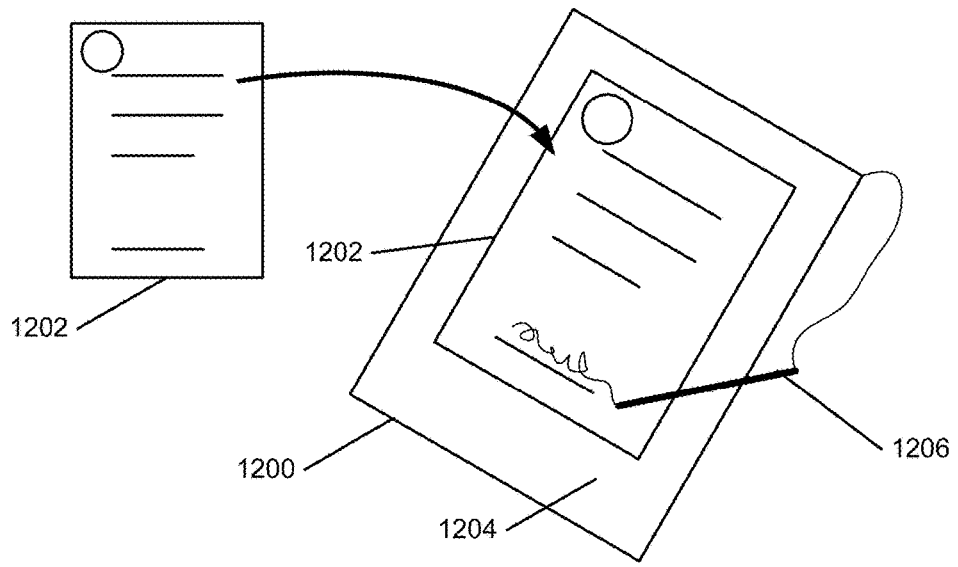
FIGS. 12A and 12B illustrate, respectively, a top view and a cross-sectional view of a writing tool that enables drawing on electronic paper in accordance with various embodiments.
Figure 12B:
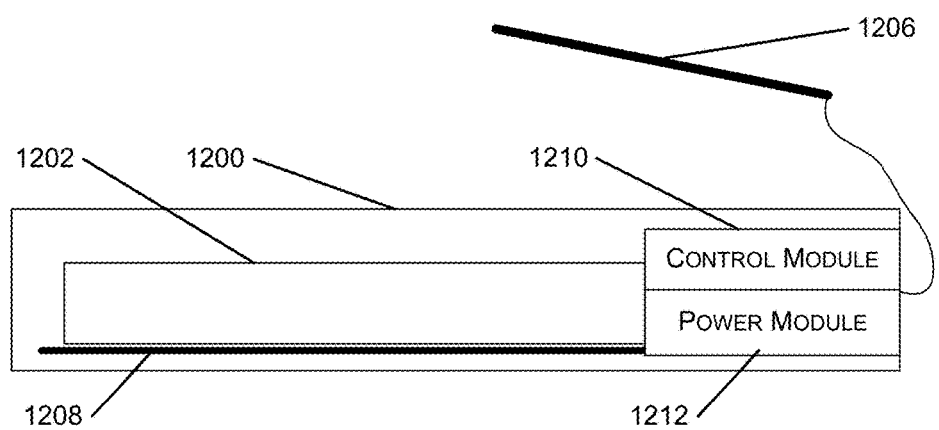

FIGS. 12A and 12B illustrate, respectively, a top view and a cross-sectional view of a writing tool 1200 that enables drawing on electronic paper 1202 in accordance with various embodiments. The electronic paper 1202, which may have an image printed on it, is placed onto a flat surface 1204 of the writing tool 1200. The writing tool 1200 may include mechanical clips, fasteners, an indentation, or other mechanism to hold the electronic paper 1202 in place. In some embodiments, friction, caused for example by a tacky quality of the flat surface may hold the electronic paper 1202 in place. A stylus 1206 is usable to draw notes onto the electronic paper 1202. A voltage differential between the tip of the stylus 1206 and an electrode 1208 situated under the flat surface 1204 (see FIG. 12B) causes the charged colored particles within the electronic ink layer of the electronic paper 1202 to move towards the top surface of the electronic paper 1202 to create written markings. In some embodiments, such as those adapted to utilize electronic paper with a conductor layer (such as is illustrated in FIGS. 6A, 8A, 9A, and 10A) an electrode may be placed on the side of the electronic paper, such as on the edge of an indentation, in order to enable a voltage to be applied to the conductor within the electronic paper. This also, in some embodiments, enables writing directly onto double-sided electronic paper, such as is illustrated in FIGS. 9A and 10A. Side-contacting electrodes in use with electronic paper having a conductor layer may also enable lower voltages to be used, lowering power requirements (e.g., less powerful batteries may be used) and improving safety.

The writing tool 1200 may have two modes. In a first mode (e.g., a "writing mode"), a relatively lower or negative charge is applied to the tip of the stylus 1206, which when applied to the surface of the electronic paper 1202 causes black (or other colored) electronic ink particles to move towards the surface of the electronic paper 1202. In a second mode (e.g., an "erase mode"), a relatively more positive or higher charge is applied to the tip of the stylus 1206, which when applied to the surface of the electronic paper 1202 causes white (or other colored) electronic ink particles to move towards the surface of the electronic paper 1202, and the black (or other colored particles to be repelled away from the surface).

A control module 1210 may control operation of the writing tool 1200, including enabling through the use of a control mechanism to control the mode of the writing tool. User selection, such as by a mechanical switch, touch-screen control, or other mechanism on the writing tool 1200 and/or the stylus 1206, may instruct the control module 1210 to select a mode. The control module 1210 may include a processor and a memory that stores instructions to operate the control module 1210 and the writing tool 1200. In some embodiments, the control module 1210 may include a logic circuit, such as an application specific integrated circuit (ASIC) or a programmable circuit (such as a field programmable gate array (FPGA)) to implement some or all of the functionality of the writing tool 1200. Embodiments are not limited to these examples, and other implementations of a control module 1210 may be utilized.

A power module 1212 supplies the power for the writing tool 1200, and provides the voltage differential between the electrode 1208 (or other electrode, such as a side electrode) and the tip of the stylus 1206 based, for example, on a usage mode, such as a "writing mode," "erase mode," or other mode.

Figure 13:
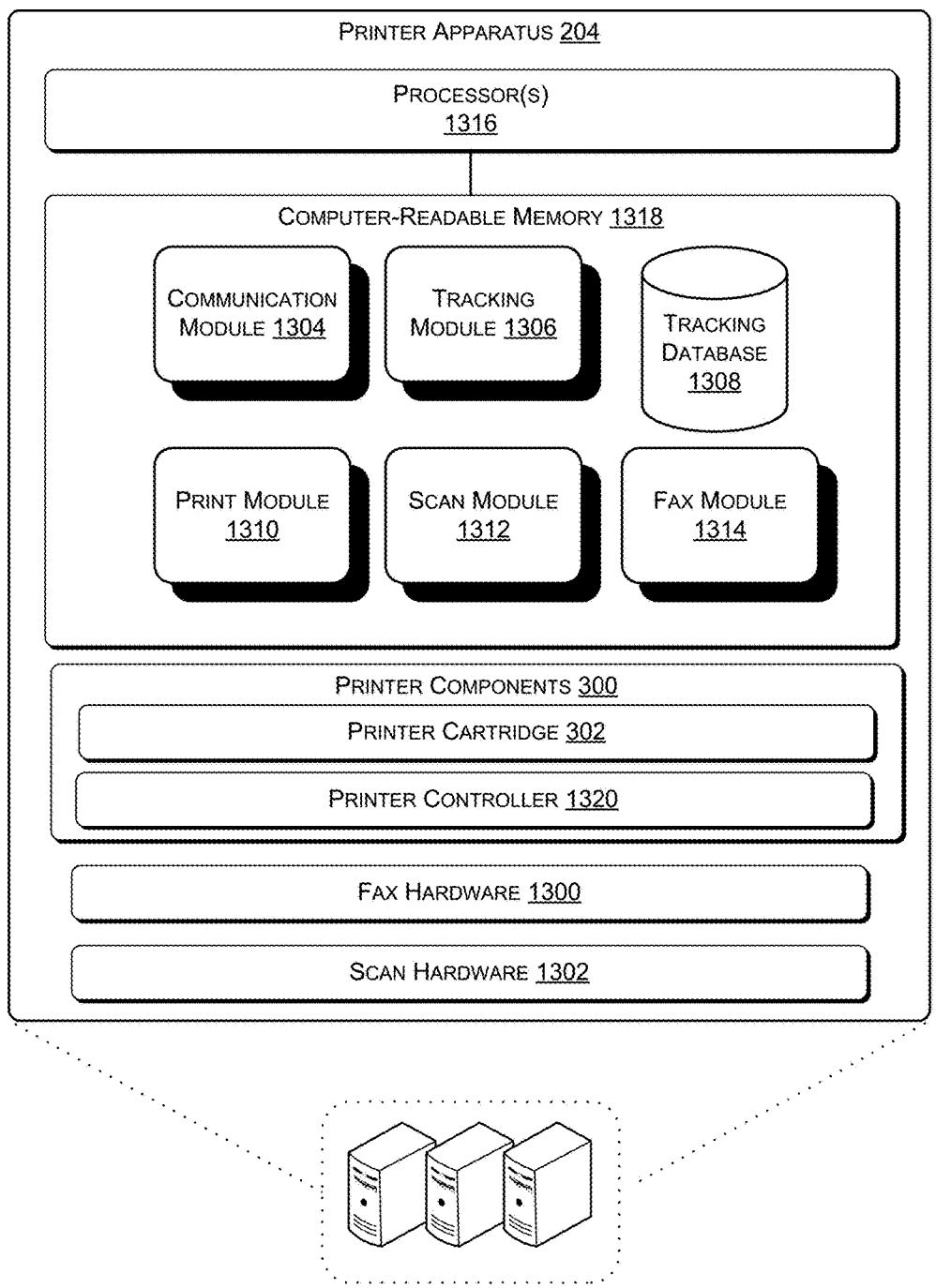
FIG. 13 illustrates a block diagram of a printer apparatus in accordance with various embodiments.

FIG. 13 illustrates a block diagram of a printer apparatus 204 in accordance with various embodiments. The printer apparatus 204 includes printer components 300, including print cartridge 302, as are described in more detail elsewhere within this Detailed Description. The printer apparatus 204 may include fax hardware 1300, which may include a modem, telecommunications logic circuitry, telephone line jack, and other components to enable the printer apparatus 204 to operate as a fax machine, enabling receipt of image data and causing the image data to be printed on a sheet of electronic (or other type of) paper. The printer apparatus 204 may include scan hardware 1302, which may include digital imaging equipment, light bulbs, feed rollers, and other components to enable the printer apparatus to act as a scanner and copier, such as receiving a piece of paper (either pulp-based or electronic paper) and reproducing the image thereon onto a sheet of electronic (or other type of) paper.

A communication module 1304 is configured to communicate with a tracking service, such as the print tracking service 214 via a network, such as the network 220. A tracking module 1306 is configured to receive scan data related to a machine-readable code on a sheet of electronic paper, and to one or more of provide the scan data or code to a tracking service (such as via the communication module 1304) and update the tracking database 1308 with a print instance. The tracking module 1306 determines whether the sheet of electronic paper has met or exceeded a threshold number of prints, such as by referring to the tracking database 1308 to determine the threshold, to determine a total number of print instances, a total number of erase instances, a number of remaining print instances, a number of remaining erase instances, and so forth. Upon determining that a threshold is met or exceeded, the tracking module 1306 may cause the printer apparatus 204 to issue a notification, such as an audible or visual notification, that the sheet of electronic paper has met or exceeded the threshold and reached end-of-life. The tracking module 1306 is configured in some embodiments refuse to allow the sheet to be printed to and/or may cause the sheet to be printed with a message, watermark, or other marking indicating that the sheet has reached end-of-life. The tracking module 1306 is configured, in some embodiments, to cause the sheet to be printed with information that indicates one or more of a total number of times that the sheet has been printed to, a number of remaining times that the sheet may be printed to, and other information.

A print module 1310 is configured to control aspects of printing, such as receiving image data—such as an image pixel map—controlling a laser diode and other components of the printer components 300 to cause sheets of electronic paper to be printed to. Where the printer apparatus 204 is a multifunction apparatus that prints to pulp-based paper or other toner-adherent media, the printer apparatus 204 may determine a type of paper and selectively enable a the printer components 300 appropriate for printing to a selected one of electronic paper or toner-adherent paper, depending on the current print job requirements.

A scan module 1312 is configured to control aspects of image scanning, such as in conjunction with scan hardware 1302, including controlling the scan hardware 1302 to scan an image (such as on a piece of paper), provide the print module 1310 with image data associated with the scanned image for printing, and so forth.

A fax module 1314 is configured to control aspects of document faxing or fax receipt, such as in conjunction with fax hardware 1300, including receiving image data via a modem, causing the image data to be printed via the print module 1310, causing scan hardware 1302 to scan an image, such as via the scan module 1312, and cause scanned image data to be communicated via the modem to a remote device over a telephone line.

The printer apparatus 204 also includes one or more processors 1316 and computer-readable memory 1318, which are described in more detail elsewhere within this Detailed Description.

The printer components 300 may also include a printer controller 1320, which may include a combination of hardware and software. For example, some functionality of the printer controller 1320 may be implemented in an application specific integrated circuit (ASIC), field programmable gate array (FPGA), or other hardware component. The printer controller 1320 may include firmware stored in a memory (such as flash memory, Read Only Memory (ROM), or other), and a processor to execute the firmware to carry out the functions of the printer controller 1320. The printer controller 1320 controls the printer components, such as operating and providing power to the various components, such as the OPC drum 304, the charge roller 306, the laser diode 310, the polygon mirror 312, an LED array if present, the toner charger 336, the transfer roller 320, the erase rollers 316 and 318, the discharge rollers 326 and 328, the fuser rollers 340, and so forth. Some or all of the functions of the print module 1310 may also be performed by the printer controller 1320.

Figure 14:
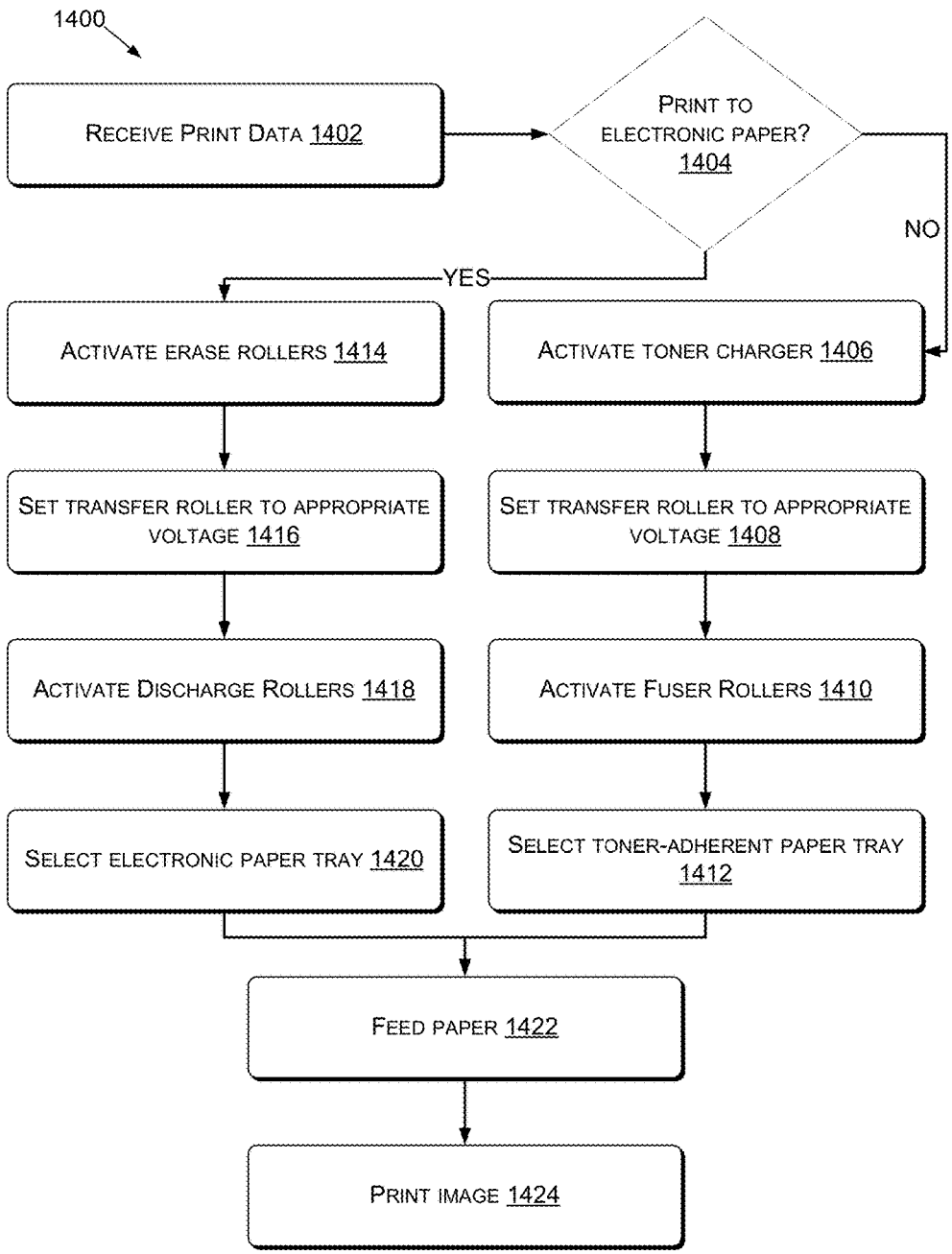
FIG. 14 shows an illustrative operation for printing on electronic paper in accordance with various embodiments.

FIG. 14 shows an illustrative operation 1400 for printing on electronic paper in accordance with various embodiments. The illustrative operation 1400 of FIG. 14 is for a printer apparatus that is multifunction—that is, it prints to both electronic paper and pulp-based or other toner-adherent paper using common printer components. A subset of the operation 1400 applies to printer apparatuses that print to electronic paper only, or that print to electronic paper and toner-adherent media using separate print components.

At 1402, a printer apparatus, such as the printer apparatus 204, receives print data. The print data may include print image data, such as a pixel map, or other image data. The print data may include metadata associated with a print job, such as whether to print double-sided, whether to collate pages, a print quality, and so forth. The print data metadata may also include a selection of one or more of electronic paper or pulp-based or other toner-adherent paper (e.g., "paper or plastic").

At 1404, a print module of the printer apparatus, such as the print module 1310, determines whether the print job is for electronic paper. Upon determining that the print job is not for electronic paper, the process proceeds to 1406-1410 which activate toner printing mechanisms within the printer apparatus. At 1406, the printer apparatus activates a toner charger, such as the toner charger 336. The toner charger charges the toner particles in the print cartridge, and enables the toner particles to be released during the print function.

At 1408, the print module causes a transfer roller of the printer components, such as the transfer roller 320, to be set to an appropriate voltage, such as positive 600 Volts, or other appropriate voltage for toner-based printing.

At 1410, the print module activates fuser rollers, such as the fuser rollers 340. The fuser rollers, upon activation, heat up to an operating temperature sufficient to melt the toner so that the toner particles adhere to the toner-adherent paper. At 1412, the print module selects a toner-adherent paper tray so that the appropriate paper for the print job is utilized in the print job. Different sized toner-adherent printer paper may be used, and thus more than one toner-adherent paper tray may be present in the printer apparatus and selected based on the print job.

Upon determining at 1404, that the print job is for electronic paper, the process proceeds to 1416-1420, which activates various electronic paper printing mechanisms within the printer components. At 1414, the print module activates the erase rollers, such as the erase rollers 316 and 318. Upon activation, the printer apparatus 204 applies a voltage differential across the erase rollers 316 and 318 to cause the electronic paper to be erased, as described in more detail elsewhere within this Detailed Description.

At 1416, the print module sets the transfer roller to an appropriate voltage for electronic paper printing. An appropriate voltage for electronic paper printing may be a ground voltage, which may be a different voltage than for pulp-based paper printing. At 1418, the print module activates discharge rollers, such that the discharge rollers each have applied to them a ground voltage in order to discharge any residual charges present on the surface of the electronic paper after the printing process.

At 1420, the print module selects an electronic paper tray so that the appropriate paper for the print job is utilized in the print job. Different sized electronic printer paper may be used, and thus more than one electronic paper tray may be present in the printer apparatus and selected based on the print job.

At 1422, the print module causes one or more sheets of paper from the selected paper tray to be fed into the printer components for printing. Depending on the type of paper selected, different mechanisms are utilized to feed the paper, including an application of different amounts of mechanical force calibrated for the type of paper selected, and so forth.

At 1424, the print module causes the image to be printed according to the received image data of the print job. This includes, in some embodiments, charging a OPC drum, selectively activating a laser diode according to an image map or other image data, scanning the laser pulses over the OPC drum to discharge portions of it, releasing toner (where appropriate), setting a voltage of the charge roller to an appropriate voltage, and other actions appropriate for the print job.

Figure 15:
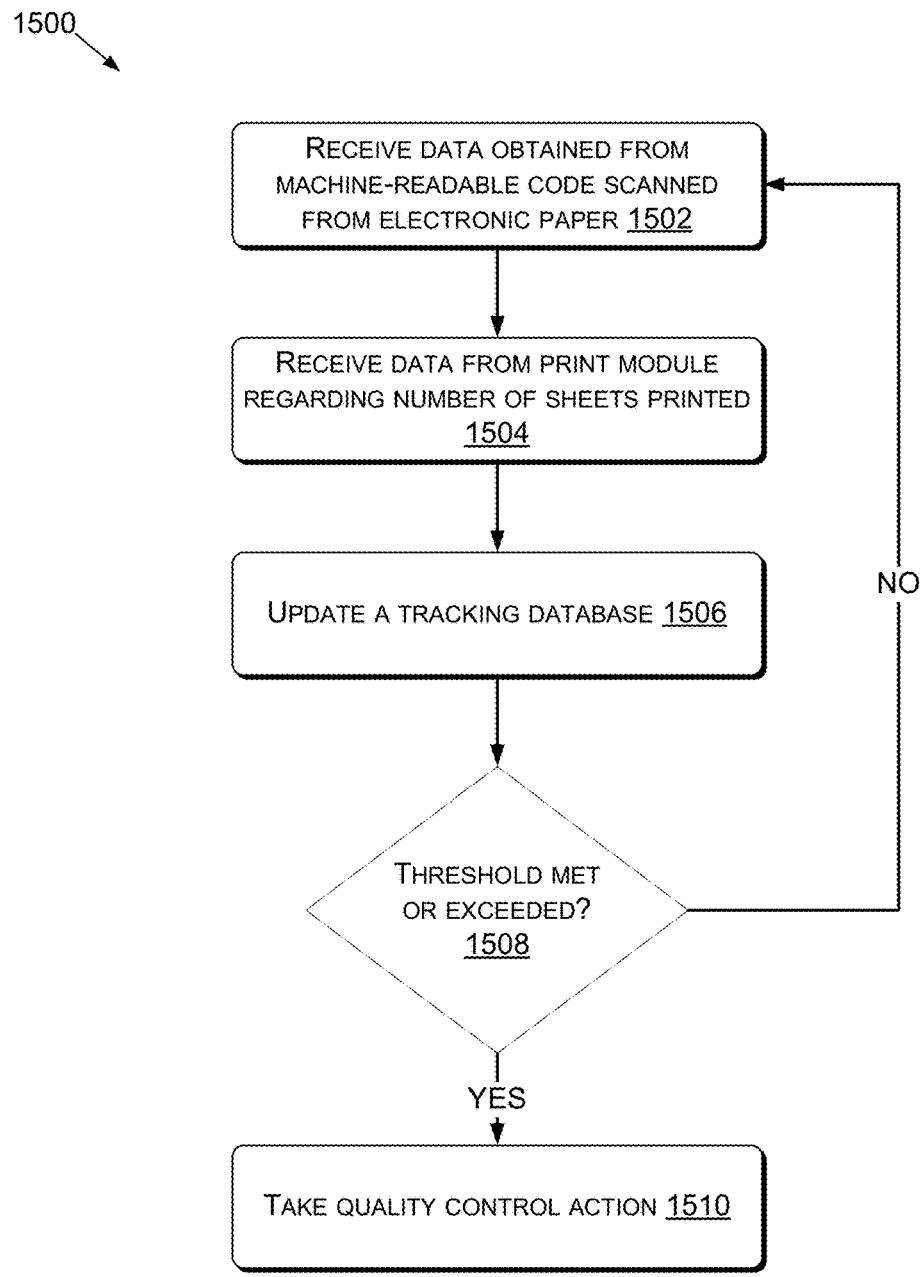
FIG. 15 shows an illustrative operation for tracking electronic paper and printer apparatus cartridge usage in accordance with various embodiments.

FIG. 15 shows an illustrative operation 1500 for tracking electronic paper and printer apparatus cartridge usage in accordance with various embodiments. At 1502, a tracking module—such as the tracking module 216, tracking module 1118, and the tracking module 1306—receives data obtained from a machine-readable code scanned from electronic paper. The machine-readable code may be scanned during a print onto the electronic paper, during a reconditioning of the electronic paper, or during some other activity. The data obtained may be the scanned image of the code, the code itself (such as may be derived by the printer apparatus, reconditioning apparatus, or tracking service from the scanned image data), an indication that the electronic paper has met or exceeded a threshold, or some other data.

At 1504, the tracking module receives data from a print module, such as the print module 1310, indicating that one or more pages have been printed by a printer apparatus. The data may be transmitted by the printer apparatus as a batch data transfer at scheduled or unscheduled intervals (such as one per hour, once per day, once per week, or other interval), in real-time as print jobs are completed, or in some other fashion.

At 1506, the tracking module updates a tracking database such as the tracking database 218, the tracking database 1120, and the tracking database 1308. The tracking database may be updated to include one or more pages that a particular printer component (such a printer cartridge) has printed, a number of times that a particular sheet of electronic paper has been printed on, a number of times that a particular sheet of electronic paper has been erased, to indicate that a printer component (such as a printer cartridge) has met or exceeded a print or time threshold, that a particular sheet of electronic paper has met or exceeded a print or time threshold, and so forth.

At 1508, the tracking module determines whether the print component or the electronic paper has met or exceeded a print or time threshold. A print threshold may be a number of pages or sides of pages that a print component has been used to print, a number of times that a particular sheet of electronic paper has been printed to, a number of times that the particular sheet of electronic paper has been erased, a remaining lifetime (measured in units of time) for electronic paper or printer components, and so forth. The thresholds may be based on observed or inferred lifetime usability of sheets of electronic paper and/or the print components, such as based on a percentile (e.g., $99^{th}$ percentile failure rate) or other statistic.

Upon determining that a threshold has been met or exceeded (the "YES" branch), the tracking module may take a quality control action. Quality control actions may include, in various embodiments, causing an alert—such as an audible or visual alert—to be presented, sending an email to an administrator, refusing to print on a page that has met or exceeded a threshold, causing a page to be ejected without printing, printing a message, watermark, or other code (with or without also printing the image) that indicates that the page has met or exceeded the threshold, feeding the page into a discard bin, or other action. Embodiments are not limited to these or other actions.

Computer-Readable Memory

In embodiments, computer-readable memory 224, 1126, and 1318 may include volatile memory (such as Random Access memory (RAM)), nonvolatile memory, removable memory, and/or non-removable memory, implemented in any method or technology for storage of information, such as computer-readable instructions, data structures, program modules, or other data. Also, the processor(s) 222, 1124, and 1316 may include onboard memory in addition to or instead of the computer-readable memory 224, 1126, and 1318. Some examples of storage media that may be included in the computer-readable memory 224, 1126, and 1318 and/or processor(s) 222, 1124, and 1316 include, but are not limited to, RAM, read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium usable to store the desired information and that can be accessed by the various apparatuses, services, and systems described herein. Any such computer-readable media may be part of the apparatuses, services, and systems described herein.

The computer-readable memory 224, 1126, and 1318, meanwhile, may include software programs or other executable modules that may be executed by the processor(s) 222, 1124, and 1316. Examples of such programs or modules include control modules (e.g., power management), network connection software, an operating system, sensor algorithms, and so forth. The computer-readable memory 224, 1126, and 1318 may also be used to store various databases, such as the tracking database 218, the tracking database 1120, and the tracking database 1308, and so forth in connection with the apparatuses, services, and systems described herein.

Various processes, instructions, methods and techniques described herein may be considered in the general context of computer-executable instructions, such as program modules, that are executable by one or more computers or other devices. Generally, program modules include routines, programs, objects, components, data structures, libraries, etc., for performing particular tasks or implementing particular abstract data types. These program modules can be implemented as software modules that are executable on the processor(s) 222, 1124, and 1316, as hardware, and/or as firmware. Typically, the functionality of the program modules may be combined or distributed as desired in various embodiments. An implementation of these modules and techniques may be stored on or transmitted across some form of computer-readable media.

The modules stored in computer-readable memory 224, 1126, and 1318 may be implemented across one or more servers in a cloud computing environment, on a local device, or on a combination of both. Embodiments do not limit the implementation of the modules stored in computer-readable memory 224, 1126, and 1318 to any particular device or environment.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. An electrically printable medium comprising:
a first polyethylene terephthalate (PET) layer;
a moisture barrier coating applied to and disposed above the first PET layer;
an electronic ink layer disposed above the moisture barrier coating such that a portion of the electronic ink layer is in direct contact with a portion of the moisture barrier coating;
a moisture barrier layer disposed above the electronic ink layer;
a second PET layer disposed above the moisture barrier layer; and
an edge seal disposed on edges of the electrically printable medium that prevents moisture variation within the electronic ink layer;
wherein the electrically printable medium is adapted to have content rendered visible thereon based on electrical signals that correspond to the content.

2. The electrically printable medium of claim 1, further comprising a conductor layer configured to receive the electrical signals from a printer.

3. The electrically printable medium of claim 1, further comprising an anti-glare layer disposed on a top surface of the first PET layer and a scratch-resistant material disposed on top of the anti-glare layer.

4. The electrically printable medium of claim 1, herein the electronic ink layer is a first electronic ink layer and the electrically printable medium further comprises:
a first conductor layer disposed below the first electronic ink layer, the first conductor layer configured to receive a first set of the electrical signals from a printer;
a second electronic ink layer disposed above the moisture barrier coating;
a second conductor layer disposed above the second electronic ink layer, the second conductor layer configured to receive a second set of the electrical signals from the printer; and
an insulator layer situated between the first conductor layer and the second conductor layer.

5. An electrically printable medium comprising:
a first flexible structural layer;
a flexible moisture barrier layer disposed above the first flexible structural layer;
a flexible electronic ink layer disposed above the flexible moisture barrier layer such that a portion of the flexible electronic ink layer is in direct contact with a portion of the flexible moisture barrier layer; and
a second flexible structural layer disposed over the flexible electronic ink layer;
wherein the electrically printable medium is flexible and is adapted to have content rendered visible thereon based on electrical signals supplied by a printer.

6. The electrically printable medium of claim 5, further comprising an edge seal that seals edges of the electrically printable medium.

7. The electrically printable medium of claim 5, wherein the second flexible structural layer is a moisture barrier film.

8. The electrically printable medium of claim 7, wherein the moisture barrier film comprises polymer film having an embedded moisture barrier.

9. The electrically printable medium of claim 7, wherein the moisture barrier film comprises a polymer film that is an intrinsic moisture blocker.

10. The electrically printable medium of claim 5, wherein the second flexible structural layer comprises a moisture barrier coating disposed thereon.

11. The electrically printable medium of claim 5, further comprising an anti-glare layer disposed on top of the second flexible structural layer and a scratch-resistant layer disposed on top of the anti-glare layer.

12. The electrically printable medium of claim 5, further comprising a transparent conductive layer situated between the first flexible structural layer and the flexible electronic ink layer, the transparent conductive layer exposed to one outside edge of the electrically printable medium.

13. The electrically printable medium of claim 5, wherein the electronic ink layer is a first flexible electronic ink layer and the electrically printable medium further comprises:
   a first flexible electrode layer disposed below the first flexible electronic ink layer;
   a second flexible electronic ink layer disposed above the first flexible structural layer;
   a second flexible electrode layer disposed above the second flexible electronic ink layer; and
   a flexible insulator layer situated between the first flexible electrode layer and the second flexible electrode layer.

14. The electrically printable medium of claim 5, wherein the first flexible structural layer comprises polyethylene terephthalate, and the electrically printable medium further comprises a transparent moisture barrier coating applied between the first flexible structural layer and the flexible electronic ink layer.

15. An electrically printable medium comprising:
   a first moisture barrier layer;
   a first electronic ink layer disposed above the first moisture barrier layer;
   a first conductor layer disposed above the first electronic ink layer;
   an insulator layer disposed above the first conductor layer;
   a second conductor layer disposed above the insulator layer;
   a second electronic ink layer disposed above the second conductor layer; and
   a second moisture barrier layer disposed above the second electronic ink layer;
   wherein the electrically printable medium is adapted to have content rendered visible thereon based on electrical signals supplied by a printer.

16. The electrically printable medium of claim 15, further comprising:
   a first flexible plastic layer disposed below the first moisture barrier layer; and
   a second flexible plastic layer disposed above the second moisture barrier layer;
   wherein:
   the first moisture barrier layer includes a first transparent coating applied onto the first flexible plastic layer, and
   the second moisture barrier layer includes a second transparent coating applied onto the second flexible plastic layer.

17. The electrically printable medium of claim 15, wherein the first conductor layer and the second conductor layer, disposed between the first and second electronic ink layers and separated by the insulator layer, are are conductive to receive at least a portion of the electrical signals from the printer.

18. The electrically printable medium of claim 15, further comprising a first anti-glare/anti-reflective coating disposed below the first moisture barrier layer and a second anti-glare/anti-reflective coating disposed above the second moisture barrier layer.

19. The electrically printable medium of claim 1, further comprising an adhesive layer disposed above the electronic ink layer such that a portion of the adhesive layer is in direct contact with a portion of the electronic ink layer,
   wherein the second moisture barrier layer is disposed above the electronic ink layer such that a portion of the second moisture barrier layer is in direct contact with a portion of the adhesive layer.

20. The electrically printable medium of claim 1, wherein the moisture barrier coating comprises at least one of silicon oxide, aluminum oxide, polyethelene, or polypropylene.

\* \* \* \* \*